(12) United States Patent
Wu et al.

(10) Patent No.: US 11,512,196 B2
(45) Date of Patent: *Nov. 29, 2022

(54) FLUORINE-CONTAINING ETHYLENE-VINYL ALCOHOL COPOLYMER RESIN COMPOSITION AS WELL AS MIXTURE AND BLEND THEREOF

(71) Applicant: CHANG CHUN PETROCHEMICAL CO., LTD., Taipei (TW)

(72) Inventors: Hou Hsi Wu, Taipei (TW); Yu Hsiu Li, Taipei (TW); Wen Hsin Lin, Taipei (TW)

(73) Assignee: CHANG CHUN PETROCHEMICAL CO., LTD., Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 17/135,798

(22) Filed: Dec. 28, 2020

(65) Prior Publication Data

US 2021/0198470 A1    Jul. 1, 2021

Related U.S. Application Data

(63) Continuation-in-part of application No. 16/877,555, filed on May 19, 2020, now Pat. No. 10,982,084, which is a continuation-in-part of application No. 16/729,984, filed on Dec. 30, 2019, now Pat. No. 10,711,124, application No. 17/135,798, which is a continuation-in-part of application No. 16/877,570, filed on May 19, 2020, now Pat. No. 10,961,375, which is a continuation-in-part of application No. 16/729,984, filed on Dec. 30, 2019, now Pat. No. 10,711,124.

(51) Int. Cl.
*C08L 23/08* (2006.01)
*C08L 29/04* (2006.01)
*C08L 27/12* (2006.01)
*C08J 3/12* (2006.01)
*C08L 29/02* (2006.01)
*C08L 27/20* (2006.01)

(52) U.S. Cl.
CPC ............. *C08L 29/02* (2013.01); *C08L 27/20* (2013.01); *C08L 2205/025* (2013.01); *C08L 2205/035* (2013.01)

(58) Field of Classification Search
CPC ............. C08L 29/02; C08L 2205/025; C08L 2205/035; C08L 27/20
See application file for complete search history.

(56) References Cited

U.S. PATENT DOCUMENTS

| | | | |
|---|---|---|---|
| 5,460,760 A | 10/1995 | Tsai et al. | |
| 10,961,375 B1 * | 3/2021 | Wu | C08L 29/04 |
| 10,982,084 B1 * | 4/2021 | Wu | C08F 14/18 |
| 2002/0143098 A1 | 10/2002 | Kawai et al. | |
| 2003/0096101 A1 | 5/2003 | Kazeto | |
| 2004/0260022 A1 | 12/2004 | Amos et al. | |
| 2006/0121270 A1 | 6/2006 | Kazeto | |
| 2008/0021381 A1* | 1/2008 | Lurvey | G01N 21/78 604/87 |
| 2008/0199645 A1 | 8/2008 | Julien | |
| 2009/0020914 A1 | 1/2009 | Nelson et al. | |
| 2009/0098395 A1 | 4/2009 | Lu | |
| 2009/0274917 A1 | 11/2009 | Kazeto | |
| 2012/0172564 A1 | 7/2012 | Fujimura et al. | |
| 2012/0245238 A1 | 9/2012 | Zerafati et al. | |
| 2015/0140247 A1 | 5/2015 | Shibutani et al. | |
| 2016/0108193 A1 | 4/2016 | Kawai et al. | |
| 2017/0267851 A1 | 9/2017 | Yamakoshi et al. | |
| 2018/0016430 A1 | 1/2018 | Shibutani et al. | |
| 2019/0085137 A1 | 3/2019 | Sato et al. | |
| 2019/0345309 A1 | 11/2019 | Okamoto et al. | |

FOREIGN PATENT DOCUMENTS

| | | |
|---|---|---|
| CN | 104513444 A | 4/2015 |
| CN | 102574382 B | 9/2015 |
| CN | 108779258 A | 11/2018 |
| CN | 110325586 A | 10/2019 |
| JP | H0299546 A | 4/1990 |
| JP | H0995583 A | 4/1997 |
| JP | 2000001593 A | 1/2000 |
| JP | 2001081262 A | 3/2001 |
| JP | 2005239902 A | 9/2005 |
| JP | 2006097033 A | 4/2006 |

(Continued)

OTHER PUBLICATIONS

Extended European Search Report issued in corresponding EP application No. 20197874 dated Mar. 26, 2021 (8 pages).
Office Action issued in corresponding JP application No. 2020-130376 dated Sep. 23, 2020 (5 pages).
Final Office Action issued in corresponding JP application No. 2020-130376 dated Feb. 22, 2021 (3 pages).
Search Report and Written Opinion issued in SG application No. 10202009461Q, dated Dec. 8, 2020 (8 pages).
Search Report issued in corresponding TW application No. 109111642, dated Aug. 13, 2020 (1 page).

(Continued)

*Primary Examiner* — Robert D Harlan

(74) *Attorney, Agent, or Firm* — Muncy, Geissler, Olds & Lowe, P.C.

(57) ABSTRACT

The instant disclosure relates to a fluorine-containing ethylene-vinyl alcohol copolymer (EVOH) resin composition as well as mixture and blend thereof. The fluorine-containing EVOH resin composition comprises EVOH and fluorine-containing particles, wherein the fluorine-containing EVOH resin composition has a total fluoride ion content ranging from 45 to 41000 ppm. The invention can reduce the adhesion of EVOH to the inside of the extruder, and effectively reduce the appearance of gel or gelled substance in subsequent finished products.

15 Claims, 3 Drawing Sheets

(56) References Cited

FOREIGN PATENT DOCUMENTS

| | | | |
|---|---|---|---|
| JP | 2006282835 A | 10/2006 |
| JP | 2006328195 A | 12/2006 |
| JP | 2006328195 A | 12/2006 |
| JP | 2008308657 A | 12/2008 |
| JP | 4832783 B2 | 12/2011 |
| JP | 2014058659 A | 4/2014 |
| JP | 2014141657 A | 8/2014 |
| JP | 2017088666 A | 5/2017 |
| TW | 201127858 A | 8/2011 |
| WO | 2014021422 A1 | 2/2014 |
| WO | WO-2015/021198 A1 | 2/2015 |
| WO | 2016104726 A1 | 6/2016 |
| WO | WO-2019131844 A1 | 7/2019 |

OTHER PUBLICATIONS

Office Action issued in corresponding TW application No. 109111642, dated Aug. 19, 2020 (3 pages).
Office Action issued in corresponding CN application No. 202010576404.0 dated Jan. 22, 2021 (6 pages).
Extended European Search Report issued in corresponding EP application No. 20208981 dated Apr. 28, 2021 (8 pages).
Search Report issued in corresponding TW application No. 109137138 dated May 24, 2021 (1 page).
Office Action issued in corresponding TW application No. 109137138 dated May 24, 2021 (2 pages).
Extended European Search Report issued in corresponding EP application No. 20208983 dated Apr. 29, 2021 (8 pages).
Search Report issued in corresponding TW application No. 109137137 dated May 24, 2021 (1 page).
Office Action issued in corresponding TW application No. 109137137 dated May 24, 2021 (2 pages).
Extended European Search Report issued in corresponding EP application No. 20 21 7416 completed Apr. 20, 2021 (9 pages).
Office Action from corresponding Korea Application 10-2020-0180107, dated Jan. 25, 2022, 7 pages.
Office Action from corresponding Korea Application 10-2020-0180106, dated Jan. 25, 2022, 7 pages.
Office Action from corresponding Singapore Application 10202009461Q, dated Jan. 13, 2022, 6 pages, in English.
Office Action from corresponding Japan Application 2020-215845, dated Feb. 1, 2022, 3 pages.
Office Action from corresponding Japan Application 2020-215844, dated Jan. 11, 2022, 7 pages.

* cited by examiner

FLUORINE-CONTAINING ETHYLENE-VINYL ALCOHOL COPOLYMER RESIN COMPOSITION AS WELL AS MIXTURE AND BLEND THEREOF

CROSS-REFERENCE TO RELATED APPLICATIONS

The scope of this application claims the priority of U.S. patent application Ser. No. 16/729,984 filed on Dec. 30, 2019 and titled "ETHYLENE VINYL ALCOHOL PELLETS AS WELL AS FILMS THEREOF", this application is a partial continuation of the patent, and the entire content of the patent is incorporated herein by reference. This application also claims the priority of U.S. patent application Ser. Nos. 16/877,555 and 16/877,570 filed on May 19, 2020, and the entire contents of which are incorporated herein by reference.

FIELD OF THE DISCLOSURE

The present invention relates to a fluorine-containing ethylene-vinyl alcohol copolymer (EVOH) resin composition. The fluorine-containing EVOH resin composition has particles, particularly fluorine-containing particles. The fluorine-containing EVOH resin composition contains a total fluoride ion content ranging from 45 to 41000 ppm. The invention also discloses a mixture and a blend containing the fluorine-containing EVOH resin composition.

BACKGROUND OF THE DISCLOSURE

EVOH resins are widely used in laminates for preserving perishable items. For example, EVOH resins and laminates are commonly used by the food packaging industry, medical device and supplies industry, pharmaceutical industry, electronics industry, and agricultural chemicals industry. EVOH resins are often incorporated as a distinct layer within a laminate to serve as an oxygen-barrier layer.

Die build-up often occurs during extruding processes utilizing EVOH. Another common problem with extruding processes utilizing EVOH is undesirable screw sticking. These problems may reduce the visual appearance of films formed from the EVOH as well as the mechanical strength. Moreover, these issues have not be sufficiently addressed or solved with conventional technology.

For example, to removing EVOH adhering to the inside of the machine equipment in the conventional technology is to add boron. However, once the boron ion concentration is too high, it will easily cause the current and pressure of the extruder to increase, and uneven dispersion of boron ions will cause too much gel in the subsequently formed film, resulting in poor film appearance.

Thus, there is a continued need for EVOH resins that provide better film mechanical properties and enable cost effective manufacturing processes.

SUMMARY OF THE INVENTION

The present invention relates to a fluorine-containing ethylene-vinyl alcohol copolymer (EVOH) resin composition, which has particles, especially fluorine-containing particles, and the fluorine-containing EVOH resin composition contains a total fluorine ion content ranging from 45 to 41000 ppm. The fluorine-containing EVOH resin composition can be used to prepare films or multi-layer structures. It has been conventional wisdom to avoid combining EVOH and fluorinated polymers because of their immiscibility. For example, the immiscibility of EVOH and fluorinated polymers was expected to adversely affect the appearance and the mechanical properties of films formed therefrom.

While the combination of EVOH and fluorinated polymers (referred herein also as "fluoropolymers") has been traditionally avoided due to problems arising from immiscibility, aspects of the disclose utilize fluoropolymers that are partially miscible (and partially immiscible) to produce EVOH resin composition having improved precipitation at the die and reduced screw sticking problems. Additionally, it was discovered that the fluorine-containing EVOH resin composition of the present invention can not only reduce the adhesion of EVOH to the inside of the extruder, effectively reduce the appearance of gel or gelled substance in subsequent finished products, improve the appearance and light transmittance of the formed film, but can also reduce the torque value and the melt pressure value of the extruder.

The fluorine-containing EVOH resin composition generally includes an ethylene-vinyl alcohol copolymer and at least one fluorine-containing particle, and the fluorine-containing EVOH resin composition may have a total fluoride ion content ranging from 45 to 41000 ppm. The fluorine-containing EVOH resin composition has a surface fluoride ion content ranging preferably 1 to 126 ppm. The ratio of the surface fluoride ion content to the total fluoride ion content of the fluorine-containing EVOH resin composition may range from 0.0015 to 0.03 ppm. In addition, according to at least one embodiment, the fluorine-containing EVOH resin composition may further have a boron content of 50 to 250 ppm.

The fluorine-containing EVOH resin composition preferably has at least two melting point temperatures—in other words, at least a first melting point temperature and a second melting point temperature. The first melting point temperature may be from about 100° C. to about 140° C., and the second melting point temperature may be from about 150° C. to about 195° C.

According to at least one embodiment, the ethylene-vinyl alcohol copolymer of the fluorine-containing EVOH resin composition has an ethylene content and a saponification degree, wherein the ethylene content is about 24 to about 48 mole %, and the saponification degree is 99.5 mole % or more; and the fluorine-containing particle includes a fluorinated polymer.

The fluorine-containing EVOH resin composition can be made into a mixture or a blend, that is, a mixture containing the fluorine-containing EVOH resin composition or a blend containing the fluorine-containing EVOH resin composition.

The mixture containing the fluorine-containing EVOH resin composition includes the fluorine-containing EVOH resin composition and a first ethylene-vinyl alcohol copolymer, wherein per 20 g of the mixture has a total fluoride ion content ranging from 100 to 11000 ppm. The ethylene content of the fluorine-containing EVOH resin composition and the ethylene content of the first ethylene-vinyl alcohol copolymer may be the same or different. The surface fluoride ion content of the mixture is preferably 2 to 55 ppm. The ratio of the surface fluoride ion content to the total fluoride ion content of the mixture is preferably between 0.0019 and 0.04.

The blend containing the fluorine-containing EVOH resin composition comprises: the fluorine-containing EVOH resin composition, a first ethylene-vinyl alcohol copolymer and a second ethylene-vinyl alcohol copolymer, wherein the first ethylene-vinyl alcohol copolymer has an ethylene content that is different from an ethylene content of the second ethylene-vinyl alcohol copolymer, and the total fluoride ion content per 20 g of the blend ranges from 200 to 2000 ppm. The ratio of the surface fluoride ion content to the total fluoride ion content of the blend preferably ranges from 0.0013 and 0.045.

BRIEF DESCRIPTION OF THE FIGURES

Implementation of the present technology will now be described, by way of example only, with reference to the attached figures, wherein.

Figure 1:
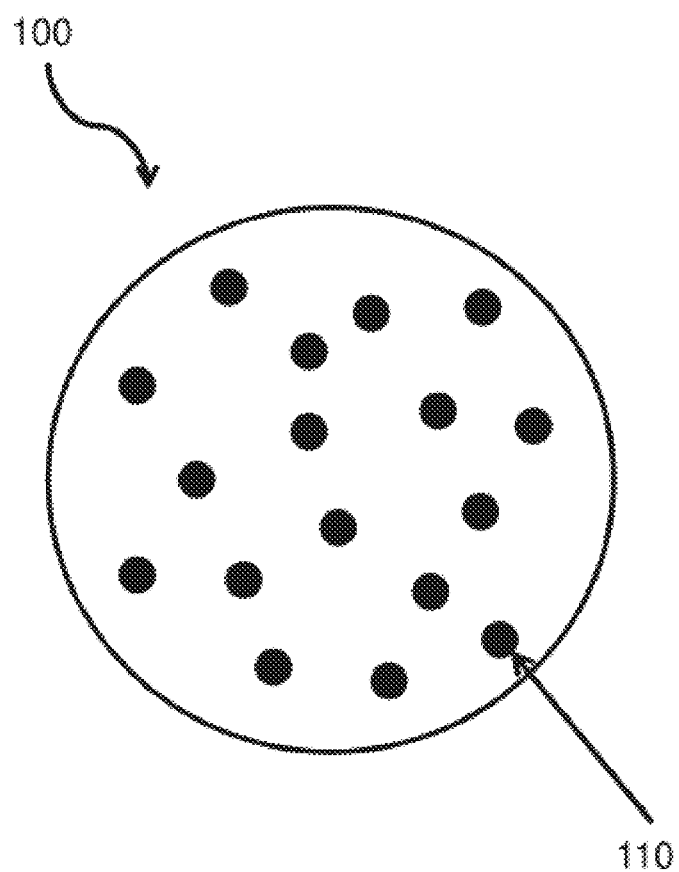
FIG. 1 is a cross-sectional depiction of an exemplary EVOH resin composition in accordance with aspects of the disclosure.

It should be understood that the various aspects are not limited to the arrangements, instrumentality, and characteristics shown in the drawings.

DETAILED DESCRIPTION OF THE DISCLOSURE

Aspects of the disclosure are directed to fluorine-containing ethylene vinyl alcohol copolymer ("EVOH") resin composition(s). The fluorine-containing EVOH resin composition have particles, particularly fluorine-containing particles, dispersed therein. The fluorine-containing EVOH resin compositions may be used to produce films or multi-layer structures.

In accordance with one aspect of the disclosure, provided is fluorine-containing EVOH resin composition. The fluorine-containing EVOH resin composition can be in the form of pellet(s), film(s), fiber(s), and/or the like. As used herein, fluorine-containing EVOH pellet(s) refer to a fluorine-containing EVOH resin composition that has been pelletized to be in the form and/or shape of one or more pellets. Although a fluorine-containing EVOH resin composition pelletized to be in the form of one or more fluorine-containing EVOH pellet(s) is described throughout the instant disclosure, the fluorine-containing EVOH resin composition may be processed to be in the form of beads, cubes, chips, shavings, or the like. The fluorine-containing EVOH resin composition of the instant disclosure typically include an ethylene-vinyl alcohol copolymer and one or more fluorine-containing particle(s) having a particle size that is not greater than 20 µm.

FIG. 1 depicts a cross-section of an exemplary fluorine-containing EVOH resin composition 100 in accordance with aspects of the disclosure. The fluorine-containing EVOH resin composition 100 is formed from an EVOH having an ethylene content. For example, the EVOH may have an ethylene content of about 24 to about 48 mole %, about 20 to about 50 mole %, about 25 to about 45 mole %, about 28 to about 42 mole %, or about 30 to about 40 mole %. The fluorine-containing EVOH resin composition 100 may be formed of two or more EVOH having different ethylene contents. For example, one of the EVOH may have an ethylene content in the range of about 20 to about 35 mole %, such as about 24 to about 35 mole %, about 28 to about 35 mole %; from about 20 to about 32 mole %, about 24 to about 32 mole %, about 28 to about 32 mole %; from about 20 to about 30 mole %, or about 24 to about 30 mole %. Additionally or alternatively, one of EVOH may have an ethylene content in the range of about 36 to about 50 mole %, such as about 40 to about 50 mole %, about 44 to about 50 mole %; from about 36 to about 45 mole %, or about 40 to about 45 mole %. In some preferred instances, however, EVOH resin composition 100 is formed from a single EVOH having an ethylene content of about 24 to about 48 mole %.

The fluorine-containing EVOH resin composition 100 has an amount of fluorine associated with the incorporation of one or more fluorinated polymer (also referred to herein as "fluoropolymer"), which can form fluorine-containing particles 110 dispersed in the EVOH resin composition 100. For example, the one or more fluoropolymers may include or be chosen from polyvinylidene fluoride ("PVDF"), polytetrafluoroethylene, polyhexafluoropropylene, polychlorotrifluoroethylene, 2-chloropentafluoropropene, dichlorodifluoroethylene, 1,1-dichlorofluoroethylene, and/or combinations thereof. Additionally or alternatively, the fluoropolymer may include copolymers derived from at least two of vinylidene fluoride ("VDF"), hexafluoropropylene ("HFP"), and tetrafluoroethylene ("TFE"). In some instances, the fluoropolymer may include copolymers derived from two or more of VDF, HFP, and TFE. For example, EVOH resin composition 100 may include a copolymer derived from VDF and HFP, a copolymer derived from TFE and HFP, a copolymer derived from VDF and TFE, and/or a copolymer derived from VDF, HFP, and TFE. While not being limited to any specific theory, the inventors believe that the fluoropolymers can reduce at least one of the melting points of the EVOH resin composition 100 by producing a reduction in the crystalline size, which reduces energy requirements during processing.

The fluorine-containing particles 110 of the fluorine-containing EVOH resin composition 100 in the form of micro particles. According to the definition of the International Union of Pure and Applied Chemistry (IUPAC), a micro particle is in the size of $10^{-7}$ to $10^{-4}$ m. In the present invention, each fluorine-containing particle 110 may have a particle size with a diameter or a length of the major axis across a cross-sectional area of 0.5 to about 19 µm, 1.0 to about 19 µm or, preferably, 1.2 to about 16 µm. The size of the fluorine-containing particles may be controlled by controlling the type or species of fluoropolymer, the amount of fluoropolymer, and the ethylene content of the EVOH copolymer. If the fluorine-containing particle is a sphere, the diameter of a cross-sectional area of the fluorine-containing particle is used to determine if the fluorine-containing particle has a desirable particle size. In a case where the fluorine-containing particle is not a sphere and/or the cross section of fluorine-containing particle has a shape other than a circle, such as an ellipse or agglomeration, the length of the major axis of a cross-sectional area of the fluorine-containing particle is used to determine if the fluorine-containing particle has a desirable particle size. The definition of the major axis is the axis with the largest length. In some instances, all of the fluorine-containing particles 110, as assessed over a cross section of a fluorine-containing EVOH resin composition 100, have a particle size of not greater than 20 µm, such as not greater than 19 µm, not greater than 18 µm, not greater than 16 µm, not greater than 14 µm, or not greater than 12 µm. In other words, in some instances, none of the fluorine-containing particles 110 have a particle size of greater than 20 µm, such as greater than 19 µm, greater than 18 µm, greater than 16 µm, greater than 14 µm, or greater than 12 µm. The fluorine-containing particles 110 may have a particle size of 0.1 μm or more, 0.3 μm or more, 0.5 μm or more, or 0.7 μm or more. For example, fluorine-containing EVOH resin composition 100 may have fluorine-containing particles 110 with a particle size of 1.0 to about 19 μm or 1.2 to about 16 μm. In some instances, all of fluorine-containing particles 110, as assessed over a cross section of a fluorine-containing EVOH resin composition 100, are within the desired particle ranges discussed herein. In some cases, however, a majority of fluorine-containing particles 110, as assessed over a cross section of a fluorine-containing EVOH resin composition 100, are within the desired particle ranges. Exemplary procedures for determining the particle size within the desired range may include: (a) the amount of fluoropolymer, (b) the ethylene content of EVOH, (c) the type of fluoropolymer (d) the temperature in extruder and (e) the rotational frequency of screw.

Figure 2:
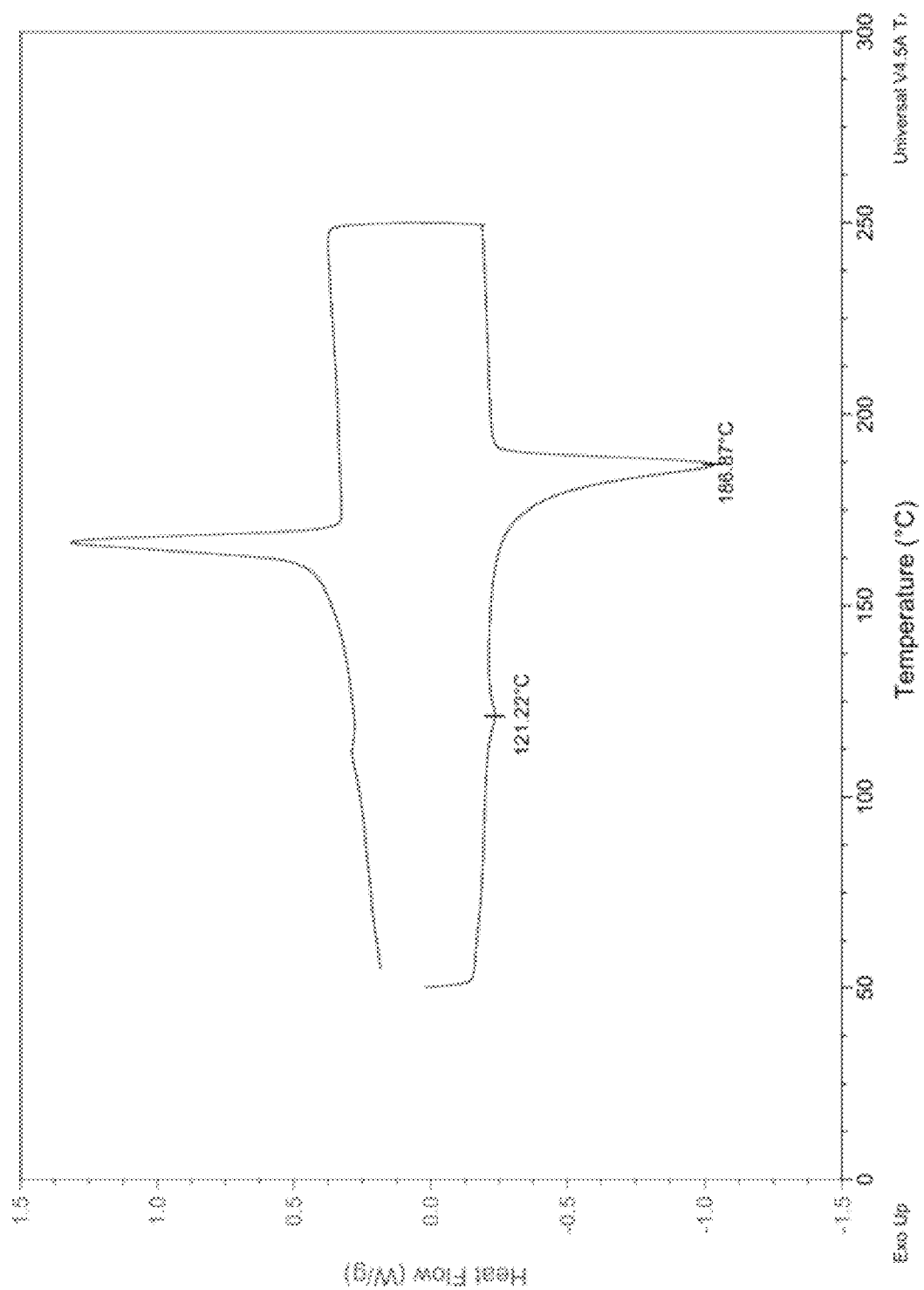
FIG. 2 is a graph of the two melting point temperatures of an exemplary EVOH resin composition according to aspects of the disclosure.

As illustrated by FIG. 2, fluorine-containing EVOH resin composition 100 may have at least two melting point temperatures. In some instances, one (e.g., a first) of the melting point temperatures of fluorine-containing EVOH resin composition 100 is from about 100° C. to about 140° C.—e.g., from about 105° C. to about 135° C., about 110° C. to about 135° C., or about 120° C. to about 130° C., wherein the first melting point temperature is derived from fluorine-containing particles. Additionally or alternatively, one (e.g., a second) of the melting point temperatures may be from about 150° C. to about 195° C.—e.g., about 158° C. to about 190° C. or about 164° C. to about 187° C., wherein the second melting point temperature is derived from ethylene-vinyl alcohol copolymer. In some instances, fluorine-containing EVOH resin composition 100 has at least three different melting point temperatures. In other instances, fluorine-containing EVOH resin composition 100 includes at least four, at least five, or at least six different melting point temperatures. Additionally and/or alternatively, fluorine-containing EVOH resin composition 100 may have a degree of saponification of 90 mole % or more, preferably 95 mole % or more, preferably 97 mole % or more, preferably 99.5 mole % or more.

The fluorine-containing EVOH resin composition 100 thereof may be free of or substantially free of polyalkyleneoxides. For example, fluorine-containing EVOH resin composition 100 may have less than 5 wt. %, such as less than 4 wt. %, less than 3 wt. %, less than 2 wt. %, less than 1 wt. %, or less than 0.5 wt. % of polyalkyleneoxides.

Figure 3:
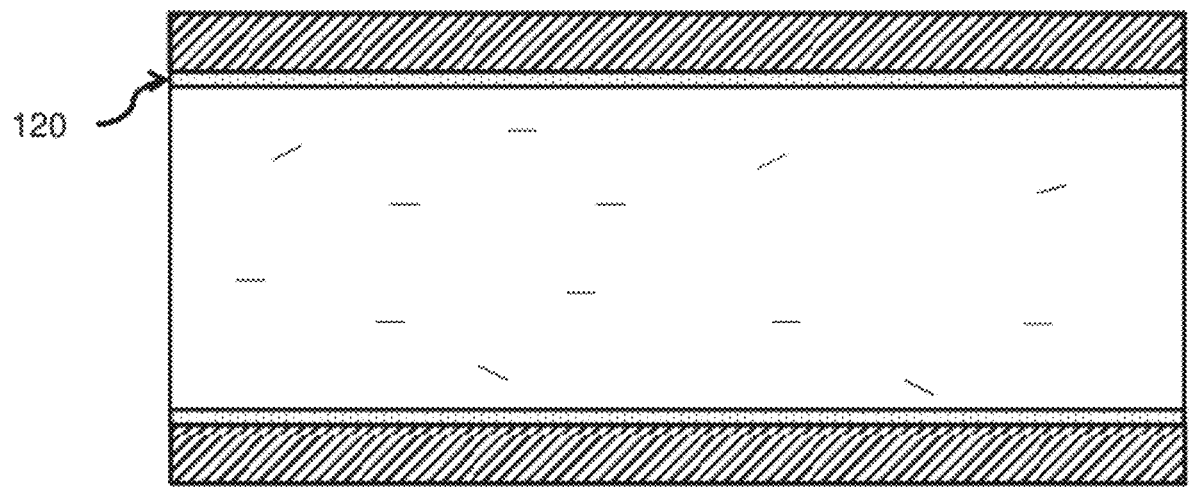
FIG. 3 is a cross-sectional depiction of an extruder with melted EVOH resin compositions according to aspects of the disclosure flowing therethrough.

The fluorine-containing EVOH resin composition 100 advantageously enables more efficient manufacture of EVOH films formed therefrom. For example, fluorine-containing EVOH resin composition 100 may improve precipitation at the die and reduce screw sticking problems during manufacture of EVOH films. Suitable processes and equipment for the manufacture of fluorine-containing EVOH films may include those readily known by one of ordinary skill in the art. By utilizing fluoropolymers that are partially miscible (and partially immiscible) and producing fluorine-containing EVOH resin composition 100 containing fluorine-containing particle(s) 110, the inventors believe that a portion of the fluoropolymers segregates and forms a coating layer 120 on the inner surface of the extruder. FIG. 3 depicts the formation of a coating layer 120 on the inner surface of an extruder by a portion of the fluoropolymers of a fluorine-containing EVOH pellet disclosed herein. Additionally, the fluorine-containing EVOH pellets may advantageously enable the extrusion process to occur at increased temperatures without discoloring the produced EVOH film, as the layer of fluorinated polymer coating the extruder inner wall may protect the EVOH resin flowing through the extruder.

On the other hand, the fluorine-containing EVOH resin composition of the present invention may include one or more of the characteristics, attributes or properties of the EVOH resin and/or pellet discussed herein. By adding fluoropolymer, it can help EVOH resin composition in screw processing. In particular, the fluoropolymer adheres to the inner wall of the screw extruder and reduces the flow resistance of the EVOH resin composition through the screw extruder. According to a preferred embodiment, the invention provides a fluorine-containing EVOH resin composition whose total fluoride ion content/concentration ranges from 45 to 41000 ppm relative to the fluorine-containing EVOH resin composition. The total fluoride ion content of the fluorine-containing EVOH resin composition may range from 45 to 41000 ppm, 45 to 38000 ppm, 45 to 35000 ppm, 45 to 33000 ppm, 45 to 30000 ppm, 45 to 28000 ppm, 45 to 25000 ppm, 45 to 23000 ppm, 45 to 20000 ppm, 45 to 18000 ppm, 45 to 15000 ppm, 45 to 13000 ppm, 45 to 10000 ppm, 45 to 8000 ppm, 45 to 5000 ppm, 45 to 3000 ppm, 45 to 1000 ppm, 45 to 800 ppm, 45 to 500 ppm, 45 to 300 ppm, 45 to 100 ppm, 100 to 41000 ppm, 100 to 38000 ppm, 100 to 35000 ppm, 100 to 33000 ppm, 100 to 30000 ppm, 100 to 28000 ppm, 100 to 25000 ppm, 100 to 23000 ppm, 100 to 20000 ppm, 100 to 18000 ppm, 100 to 15000 ppm, 100 to 13000 ppm, 100 to 10000 ppm, 100 to 8000 ppm, 100 to 5000 ppm, 100 to 3000 ppm, 100 to 1000 ppm, 100 to 800 ppm, 100 to 500 ppm, 100 to 300 ppm, 1000 to 41000 ppm, 1000 to 38000 ppm, 1000 to 35000 ppm, 1000 to 33000 ppm, 1000 to 30000 ppm, 1000 to 28000 ppm, 1000 to 25000 ppm, 1000 to 23000 ppm, 1000 to 20000 ppm, 1000 to 18000 ppm, 1000 to 15000 ppm, 1000 to 13000 ppm, 1000 to 10000 ppm, 1000 to 8000 ppm, 1000 to 5000 ppm, 1000 to 3000 ppm, 10000 to 41000 ppm, 10000 to 38000 ppm, 10000 to 35000 ppm, 10000 to 33000 ppm, 10000 to 30000 ppm, 10000 to 28000 ppm, 10000 to 25000 ppm, 10000 to 23000 ppm, 10000 to 20000 ppm, 10000 to 18000 ppm, 10000 to 15000 ppm, 10000 to 13000 ppm, 20000 to 41000 ppm, 20000 to 38000 ppm, 20000 to 35000 ppm, 20000 to 33000 ppm, 20000 to 30000 ppm, 20000 to 28000 ppm, 20000 to 25000 ppm, 20000 to 23000 ppm, 30000 to 41000 ppm, 30000 to 38000 ppm, 30000 to 35000 ppm, or 30000 to 33000 ppm. It was unexpectedly discovered that if the total fluoride ion content of the fluorine-containing EVOH resin composition is in the range of 45 to 41000 ppm, the fluorine can act as a lubricant and an anti-sticking agent to reduce the sticking on the die or screw during processing to improve processability. In addition, in the present invention, as long as the total fluorine ion content of the fluorine-containing EVOH resin composition 100 containing the fluorine-containing particles 110 is within a desired range, fisheyes generated during EVOH film formation can be reduced to improve mechanical properties and film appearance. The above-mentioned total fluorine content is related to the type of the added fluoropolymer, the amount of fluoropolymer, the ethylene content of EVOH, the mixing method, the boron content, etc. Therefore, a skilled person can adjust the total fluoride ion content of the fluorine-containing EVOH resin composition 100 within a desired range.

According to a preferred embodiment, the present invention provides a fluorine-containing EVOH resin composition having a surface fluoride ion content ranging from 1 to 126 ppm relative to the fluorine-containing EVOH resin composition. The surface fluoride ion content of the fluorine-containing EVOH resin composition can range from 1 to 126 ppm, 1 to 115 ppm, 1 to 100 ppm, 1 to 90 ppm, 1 to 80 ppm, 1 to 70 ppm, 1 to 60 ppm, 1 to 50 ppm, 1 to 40 ppm, 1 to 30 ppm, 1 to 20 ppm, 1 to 10 ppm, 5 to 126 ppm, 5 to 115 ppm, 5 to 100 ppm, 5 to 90 ppm, 5 to 80 ppm, 5 to 70 ppm, 5 to 60 ppm, 5 to 50 ppm, 5 to 40 ppm, 5 to 30 ppm, 5 to 20 ppm, 5 to 10 ppm, 15 to 126 ppm, 15 to 115 ppm, 15 to 100 ppm, 15 to 90 ppm, 15 to 80 ppm, 15 to 70 ppm, 15 to 60 ppm, 15 to 50 ppm, 15 to 40 ppm, 15 to 30 ppm, 15 to 20 ppm, 25 to 126 ppm, 25 to 115 ppm, 25 to 100 ppm, 25 to 90 ppm, 25 to 80 ppm, 25 to 70 ppm, 25 to 60 ppm, 25 to 50 ppm, 25 to 40 ppm, 25 to 30 ppm, 35 to 126 ppm, 35 to 115 ppm, 35 to 100 ppm, 35 to 90 ppm, 35 to 80 ppm, 35 to 70 ppm, 35 to 60 ppm, 35 to 50 ppm, 35 to 40 ppm, 45 to 126 ppm, 45 to 115 ppm, 45 to 100 ppm, 45 to 90 ppm, 45 to 80 ppm, 45 to 70 ppm, 45 to 60 ppm, 45 to 50 ppm, 55 to 126 ppm, 55 to 115 ppm, 55 to 100 ppm, 55 to 90 ppm, 55 to 80 ppm, 55 to 70 ppm, 55 to 60 ppm, 65 to 126 ppm, 65 to 115 ppm, 65 to 100 ppm, 65 to 90 ppm, 65 to 80 ppm, 65 to 70 ppm, 75 to 126 ppm, 75 to 115 ppm, 75 to 100 ppm, 75 to 90 ppm, 75 to 80 ppm, 85 to 126 ppm, 85 to 115 ppm, 85 to 100 ppm, 85 to 90 ppm, 95 to 126 ppm, 95 to 115 ppm, 95 to 100 ppm, 105 to 126 ppm, 105 to 115 ppm, or 120 to 126 ppm. The "surface fluoride ion content" means that the amount of fluorine compound present near the surface of the EVOH resin pellet, which is different from the total fluoride ion content in the EVOH resin pellet. The surface fluoride ion content is analyzed by ion chromatography (Metrohm 930 Compact IC Flex/Ses/PP/Deg) with NIEA W415.54B water anion test method. Put 0.5 g of sample pellets into 5 c.c. methanol for pretreatment, move the solution to a 60° C. environment and stir it for 4 hours, filter and remove the pellets, take the 0.5 c.c. liquid obtained and burn it with oxygen bomb, then extract it with water and conduct a test. That is, by dissolving EVOH in a slightly soluble methanol solution, fluoride ions on the surface are deposited.

The content of the surface fluoride ion is comprehensively affected by the type of fluoropolymer, the amount of fluoropolymer added, the ethylene content, and the boron content, etc. The actual amount of fluorine present on the surface is mainly affected by the amount of fluoropolymer added, but the type of fluoropolymer and the ethylene content will affect the degree of reaction between EVOH and fluoropolymer, resulting in a difference in the ratio of the concentration of fluorine present on the surface of EVOH to that in EVOH pellets. In addition, the content of boron affects the viscosity of EVOH, which in turn affects the reaction time, and boron has a certain degree of competition with fluorine-containing particles and may also react slightly with EVOH, resulting in a difference in the fluorine concentration on the surface. Therefore, the surface fluorine content of the present invention is the result of comprehensive testing of the effects of fluoropolymer type, fluoropolymer addition amount, ethylene content and boron content, and those with ordinary knowledge in the technical field of the present invention can adjust the above variables according to routine tests to obtain the required surface fluorine concentration.

Additionally or alternatively, in a preferred embodiment, the present invention provides a fluorine-containing EVOH resin composition, wherein the ratio of the surface fluoride ion content to the total fluoride ion content of the composition is in the range of 0.0015 to 0.03. The ratio of the surface fluoride ion content to the total fluoride ion content of the fluorine-containing EVOH resin composition may be between 0.0015 to 0.03, 0.0015 to 0.028, 0.0015 to 0.026, 0.0015 to 0.024, 0.0015 to 0.022, 0.0015 to 0.02, 0.0015 to 0.018, 0.0015 to 0.016, 0.0015 to 0.014, 0.0015 to 0.012, 0.0015 to 0.01, 0.0015 to 0.007, 0.0015 to 0.005, 0.0015 to 0.003, 0.0015 to 0.0025, 0.0015 to 0.002, 0.0015 to 0.0017, 0.003 to 0.03, 0.003 to 0.028, 0.003 to 0.026, 0.003 to 0.024, 0.003 to 0.022, 0.003 to 0.02, 0.003 to 0.018, 0.003 to 0.016, 0.003 to 0.014, 0.003 to 0.012, 0.003 to 0.01, 0.003 to 0.007, 0.003 to 0.005, 0.005 to 0.03, 0.005 to 0.028, 0.005 to 0.026, 0.005 to 0.024, 0.005 to 0.022, 0.005 to 0.02, 0.005 to 0.018, 0.005 to 0.016, 0.005 to 0.014, 0.005 to 0.012, 0.005 to 0.01, 0.005 to 0.007, 0.007 to 0.03, 0.007 to 0.028, 0.007 to 0.026, 0.007 to 0.024, 0.007 to 0.022, 0.007 to 0.02, 0.007 to 0.018, 0.007 to 0.016, 0.007 to 0.014, 0.007 to 0.012, 0.007 to 0.01, 0.009 to 0.03, 0.009 to 0.028, 0.009 to 0.026, 0.009 to 0.024, 0.009 to 0.022, 0.009 to 0.02, 0.009 to 0.018, 0.009 to 0.016, 0.009 to 0.014, 0.009 to 0.012, 0.009 to 0.01, 0.011 to 0.03, 0.011 to 0.028, 0.011 to 0.026, 0.011 to 0.024, 0.011 to 0.022, 0.011 to 0.02, 0.011 to 0.018, 0.011 to 0.016, 0.011 to 0.014, 0.011 to 0.012, 0.015 to 0.03, 0.015 to 0.028, 0.015 to 0.016, 0.015 to 0.024, 0.015 to 0.022, 0.015 to 0.02, 0.015 to 0.018, 0.015 to 0.016, 0.02 to 0.03, 0.02 to 0.028, 0.02 to 0.026, 0.02 to 0.024, 0.02 to 0.022, 0.025 to 0.03, 0.025 to 0.028, or 0.025 to 0.026. According to one aspect of the present invention, when the total fluoride ion content is high and the surface fluoride ion content is low, the fluoride ion may be released at a later stage in the extruder, which affects the light transmittance. If there is a certain level of surface fluoride ions, fluoride ions will be released earlier to reduce precipitation, without waiting for EVOH to melt and disintegrate. However, too much surface fluoride ions will affect the gelation during film formation. Therefore, by controlling the ratio of the surface fluoride ion content to the total fluoride ion content within a specific range, the light transmittance can be improved.

The fluorine-containing EVOH resin composition can, in some cases, contain a boron compound and/or boron acid and/or cinnamic acid and/or alkali metal and/or conjugated polyene and/or lubricant and/or alkali earth metal. The substances described above may lead to better properties in the EVOH resin composition.

Additionally or alternatively, according to further aspects of the disclosure, the fluorine-containing EVOH resin composition may have fluorine-containing particles and a boron content of 50 to 250 ppm, which is calculated based on the final fluorine-containing EVOH resin composition. Without being limited to any specific theory, it is believed that the addition of a boron compound in EVOH resin composition having fluorine-containing particles, such that the boron content of the EVOH is from 50 to 250 ppm, reduces or eliminates the sticking of the EVOH resin composition during extrusion through a screw extruder and further improves the film thickness uniformity and flexibility. In some instances, such EVOH resin compositions may clean the screw extruder during the extrusion process by removing or at least partially removing EVOH resin previously stuck to the inner surfaces of the screw extruder.

A typical fluorine-containing EVOH resin composition may comprise an ethylene-vinyl alcohol copolymer; one or more fluorine-containing particles; and a boron compound, where the ethylene-vinyl alcohol copolymer resin composition has a boron content of 50 to 250 ppm. In some instances, the fluorine-containing EVOH resin composition may have a boron content of about 50 to 250 ppm, about 50 to about 225 ppm, about 50 to about 200 ppm, about 50 to about 175 ppm, about 50 to about 150 µm, about 50 to about 125 ppm, about 50 to about 100 ppm, about 75 to 250 ppm, about 75 to about 225 ppm, about 75 to about 200 ppm, about 75 to about 175 ppm, about 75 to about 150 µm, about 75 to about 125 ppm, about 75 to about 100 ppm, about 100 to 250 ppm, about 100 to about 225 ppm, about 100 to about 200 ppm, about 100 to about 175 ppm, about 100 to about 150 µm, about 100 to about 125 ppm, about 150 to 250 ppm, about 150 to about 225 ppm, about 150 to about 200 ppm, about 150 to about 175 ppm, about 200 to 250 ppm, or about 200 to about 225 ppm based on the total weight of the fluorine-containing EVOH resin composition. When the boron content of the fluorine-containing EVOH resin composition is within a certain range, it can increase the viscosity of the fluorine-containing EVOH resin composition and reduce the chance of the fluorine-containing EVOH resin composition sticking to the screw, or remove the EVOH on the screw, so that the material has a self-cleaning function, which further improving the film thickness uniformity. In addition to a boron content of 50 to 250 ppm, the fluorine-containing EVOH resin composition can, in some cases, contain cinnamic acid, alkali metal, conjugated polyene, lubricant, alkali earth metal, salts thereof, and/or mixtures thereof. The substances described above are common substance usually existing in the EVOH resin composition leading to better properties. When the content of the conjugated polyene in the fluorine-containing EVOH resin composition per unit weight is 1 to 30000 ppm, the coloration after heating can be further suppressed and the thermal stability can be improved. When the content of the alkali metal or alkali earth metal in the fluorine-containing EVOH resin composition per unit weight is 1 to 1000 ppm in terms of metal, the long-term operation formability can be improved. When the content of the lubricant in the fluorine-containing EVOH resin composition per unit weight is 1 to 300 ppm, the processability can be improved.

In an aspect of the present invention, the boron content is controlled to be within a specific range with the presence of a fluoropolymer. In addition to improving the flexibility and processing characteristics of EVOH, it can further improve the appearance characteristics of the final product.

The boron compounds may, in some instances, include boric acid or a metal salt thereof. Examples of the metal salt include, but are not limited to, calcium borate, cobalt borate, zinc borate (e.g. zinc tetraborate, zinc metaborate), potassium aluminum borate, ammonium borate (e.g. ammonium metaborate, ammonium tetraborate, ammonium pentaborate, ammonium octaborate), cadmium borate (e.g. cadmium orthoborate, cadmium tetraborate), potassium borate (e.g. potassium metaborate, potassium tetraborate, potassium pentaborate, potassium hexaborate, potassium octaborate), silver borate (e.g. silver metaborate, silver tetraborate), copper borate (e.g. copper (II) borate, copper metaborate, copper tetraborate), sodium borate (e.g. sodium metaborate, sodium diborate, sodium tetraborate, sodium pentaborate, sodium hexaborate, sodium octaborate), lead borate (e.g. lead metaborate, lead hexaborate), nickel borate (e.g. nickel orthoborate, nickel diborate, nickel tetraborate, nickel octaborate), barium borate (e.g. barium orthoborate, barium metaborate, barium diborate, barium tetraborate), bismuth borate, magnesium borate (e.g. magnesium orthoborate, magnesium diborate, magnesium metaborate, trimagnesium tetraborate, pentamagnesium tetraborate), manganese borate (e.g. manganese (1) borate, manganese metaborate, manganese tetraborate), lithium borate (e.g. lithium metaborate, lithium tetraborate, lithium pentaborate), salts thereof, or combinations thereof. Borate mineral such as borax, kainite, inyonite, kotoite, suanite, azaibelyite, and szaibelyite may be included. Of these, borax, boric acid, and sodium borate such as sodium metaborate, sodium diborate, sodium tetraborate, sodium pentaborate, sodium hexaborate, and sodium octaborate are preferably used.

In still another aspect, the present invention provides a mixture containing fluorine-containing EVOH resin composition, which comprises the fluorine-containing EVOH resin composition and a first ethylene-vinyl alcohol copolymer, wherein per 20 g of the mixture has a total fluoride ion content ranging from 100 and 11000 ppm. The total fluoride ion content can range from 100 to 11000 ppm, 100 to 10000 ppm, 100 to 8500 ppm, 200 to 8500 ppm, 200 to 7500 ppm, 200 to 6500 ppm, 500 to 5000 ppm, 500 to 4000 ppm, 500 to 3000 ppm, 800 to 3000 ppm, 800 to 2000 ppm, 800 to 1500 ppm, 800 to 1250 ppm, 800 to 1000 ppm, 1100 to 2000 ppm, 1100 to 1750 ppm, 1100 to 1500 ppm, 1100 to 1250 ppm, 1400 to 2000 ppm, 1400 to 1750 ppm, 1400 to 1500 ppm, or 1700 to 2000 ppm. The surface fluoride ion content of the mixture can range from 2 to 55 ppm, 2 to 50 ppm, 2 to 45 ppm, 2 to 40 ppm, 2 to 35 ppm, 2 to 30 ppm, 2 to 25 ppm, 2 to 20 ppm, 2 to 15 ppm, 2 to 10 ppm, 5 to 55 ppm, 5 to 50 ppm, 5 to 45 ppm, 5 to 40 ppm, 5 to 35 ppm, 5 to 30 ppm, 5 to 25 ppm, 5 to 20 ppm, 5 to 15 ppm, 5 to 10 ppm, 15 to 55 ppm, 15 to 50 ppm, 15 to 45 ppm, 15 to 40 ppm, 15 to 35 ppm, 15 to 30 ppm, 15 to 25 ppm, 15 to 20 ppm, 30 to 55 ppm, 30 to 50 ppm, 30 to 45 ppm, 30 to 40 ppm, 30 to 35 ppm, 45 to 55 ppm, or 45 to 50 ppm. The ratio of the surface fluoride ion content to the total fluoride ion content of the mixture is preferably 0.0019 to 0.04, for example, the ratio ranges from 0.0019 to 0.04, 0.0019 to 0.035, 0.0019 to 0.03, 0.0019 to 0.025, 0.0019 to 0.02, 0.0019 to 0.015, 0.0019 to 0.01, 0.0019 to 0.005, 0.0019 to 0.004, 0.0019 to 0.003, 0.0025 to 0.04, 0.0025 to 0.035, 0.0025 to 0.03, 0.0025 to 0.025, 0.0025 to 0.02, 0.0025 to 0.015, 0.0025 to 0.01, 0.0025 to 0.005, 0.0025 to 0.004, 0.005 to 0.04, 0.005 to 0.035, 0.005 to 0.03, 0.005 to 0.025, 0.005 to 0.02, 0.005 to 0.015, 0.005 to 0.01, 0.0075 to 0.04, 0.0075 to 0.035, 0.0075 to 0.03, 0.0075 to 0.025, 0.0075 to 0.02, 0.0075 to 0.015, 0.0075 to 0.01, 0.01 to 0.04, 0.01 to 0.035, 0.01 to 0.03, 0.01 to 0.025, 0.01 to 0.02, 0.0125 to 0.04, 0.0125 to 0.035, 0.0125 to 0.03, 0.0125 to 0.025, 0.0125 to 0.02, 0.015 to 0.04, 0.015 to 0.035, 0.015 to 0.03, 0.015 to 0.025, 0.015 to 0.02, 0.0175 to 0.04, 0.0175 to 0.035, 0.0175 to 0.03, 0.0175 to 0.025, 0.02 to 0.04, 0.02 to 0.035, 0.02 to 0.03, 0.02 to 0.025, 0.0225 to 0.04, 0.0225 to 0.035, 0.0225 to 0.03, 0.025 to 0.04, 0.025 to 0.035, or 0.03 to 0.04.

The ethylene content of the fluorine-containing EVOH resin composition and the ethylene content of the first ethylene-vinyl alcohol copolymer may be the same or different. According to a preferred embodiment, the present invention provides a mixture containing fluorine-containing EVOH resin composition, which comprises the fluorine-containing EVOH resin composition and a first ethylene-vinyl alcohol copolymer, wherein per 20 g of the mixture has a total fluoride ion content in the range of 100 to 11000 ppm, wherein the ethylene content of the fluorine-containing EVOH resin composition and the ethylene content of the first ethylene-vinyl alcohol copolymer can be the same. The mixture containing fluorine-containing EVOH resin composition obtained according to the above (also referred to as general purpose resin herein) has EVOH with a single ethylene content, which can be selected according to different gas barrier properties, flexibility characteristics, and light transmittance. The mixture can generally be used to make, for example, food packaging films. According to another preferred embodiment, the present invention provides a mixture containing fluorine-containing EVOH resin composition, which comprises the fluorine-containing EVOH resin composition and a first ethylene-vinyl alcohol copolymer, wherein per 20 g of the mixture has a total fluoride ion content in the range of 100 to 11000 ppm, and wherein the ethylene content of the fluorine-containing EVOH resin composition and the ethylene content of the first ethylene-vinyl alcohol copolymer can be different. Among the mixtures containing fluorine-containing EVOH resin composition obtained according to the above (also referred to as thermoforming resins herein), EVOH with lower ethylene content has better gas barrier properties due to the higher proportion of hydrogen bonds, while EVOH with higher ethylene content has better tensile properties. Therefore, mixing two kinds of EVOH with different ethylene content can take into account both gas barrier properties and tensile properties, so it is often used in molded container packaging, such as food containers or cosmetic bottles. Besides, the mixture containing fluorine-containing EVOH resin composition may contain boron or not contain boron at all.

According to an embodiment of the present invention, the invention provides a blend containing a fluorine-containing EVOH resin composition, which comprises: the fluorine-containing EVOH resin composition, a first ethylene-vinyl alcohol copolymer and a second ethylene-vinyl alcohol copolymer, wherein the ethylene content of the first ethylene-vinyl alcohol copolymer is different from the ethylene content of the second ethylene-vinyl alcohol copolymer, and the ethylene content of the fluorine-containing EVOH resin composition is the same as or different from the ethylene content of the first ethylene-vinyl alcohol copolymer and the second ethylene-vinyl alcohol copolymer, respectively; and wherein per 20 g of the blend has a total fluoride ion content in the range of 200 to 2000 ppm. The total fluoride ion content can be in the range of 200 to 2000 ppm, 200 to 1750 ppm, 200 to 1500 ppm, 200 to 1250 ppm, 200 to 1000 ppm, 200 to 750 ppm, 200 to 500 ppm, 500 to 2000 ppm, 500 to 1750 ppm, 500 to 1500 ppm, 500 to 1250 ppm, 500 to 1000 ppm, 500 to 750 ppm, 800 to 2000 ppm, 800 to 1750 ppm, 800 to 1500 ppm, 800 to 1250 ppm, 800 to 1000 ppm, 1100 to 2000 ppm, 1100 to 1750 ppm, 1100 to 1500 ppm, 1100 to 1250 ppm, 1400 to 2000 ppm, 1400 to 1750 ppm, 1400 to 1500 ppm, or 1700 to 2000 ppm. The ratio of the surface fluorine content to the total fluoride ion content of the blend ranges from 0.0013 to 0.045, for example, the ratio ranges from 0.0013 to 0.045, 0.0013 to 0.035, 0.0013 to 0.025, 0.0013 to 0.015, 0.0013 to 0.0095, 0.0013 to 0.0085, 0.0013 to 0.0075, 0.0013 to 0.0065, 0.0013 to 0.0055, 0.0013 to 0.0045, 0.0013 to 0.0035, 0.0013 to 0.0025, 0.002 to 0.045, 0.002 to 0.035, 0.002 to 0.025, 0.002 to 0.015, 0.002 to 0.0095, 0.002 to 0.0085, 0.002 to 0.0075, 0.002 to 0.0065, 0.002 to 0.0055, 0.002 to 0.0045, 0.002 to 0.0035, 0.004 to 0.045, 0.004 to 0.035, 0.004 to 0.025, 0.004 to 0.015, 0.004 to 0.0095, 0.004 to 0.0085, 0.004 to 0.0075, 0.004 to 0.0065, 0.004 to 0.0055, 0.006 to 0.045, 0.006 to 0.035, 0.006 to 0.025, 0.006 to 0.015, 0.006 to 0.0095, 0.006 to 0.0085, 0.006 to 0.0075, 0.008 to 0.045, 0.008 to 0.035, 0.008 to 0.025, 0.008 to 0.015, 0.008 to 0.0095, 0.01 to 0.045, 0.01 to 0.035, 0.01 to 0.025, 0.01 to 0.015, 0.015 to 0.045, 0.015 to 0.035, 0.015 to 0.025, 0.02 to 0.045, or 0.02 to 0.035.

According to a preferred embodiment, the present invention provides a blend containing fluorine-containing EVOH resin composition, which comprises: the fluorine-containing EVOH resin composition, a first ethylene-vinyl alcohol copolymer and a second ethylene-vinyl alcohol copolymer, wherein the ethylene content of the first ethylene-vinyl alcohol copolymer is different from the ethylene content of the second ethylene-vinyl alcohol copolymer, and wherein per 20 g of the blend has a total fluoride ion content in the range of 200 to 2000 ppm, and the blend containing fluorine-containing EVOH resin composition may contain boron or not contain boron at all. The aforementioned blend containing fluorine-containing EVOH resin composition (also referred to as special resin herein) is based on the concept of thermoforming resin formats, which more comprehensively averages the properties of the molding materials, and may be subsequently applied to such areas as tire inner liners or oil storage pipes. The "mixture" and "blend" referred to herein are both formed by mixing the fluorine-containing EVOH resin composition of the present invention and fluorine-free EVOH (pure EVOH), however, in order to distinguish between general purpose resin, thermoforming resin and special resin, they are defined as follows. The "mixture" in this article means that the fluorine-containing EVOH resin composition of the present invention is only mixed with a fluorine-free EVOH (pure EVOH), wherein the ethylene content of the pure EVOH and the ethylene content of the fluorine-containing EVOH resin composition of the present invention may be the same or different, and the mixture can be added with other required additives without limitation. The "blend" in this article refers to the fluorine-containing EVOH resin composition of the present invention mixed with fluorine-free EVOHs (pure EVOHs) with at least two different ethylene contents, and other required additives can be added without limitation.

EXAMPLES

The following non-limiting examples of aspects of the invention are provided primary for the purpose of elucidating aspects of the invention and the benefits derived therefrom.

Example 1

Four fluoropolymers (Example Fluoropolymers A-D) were prepared according to aspects of the disclosure. Example Fluoropolymers A-D were subsequently used for producing fluorine-containing ethylene vinyl alcohol copolymer (hereafter "EVOH") resin composition according to the instant disclosure. Although Example Fluoropolymers A-D were prepared according to the specific process disclosed below, other types of fluoropolymers may be used for addition with the EVOH.

Example Fluoropolymer A

Example Fluoropolymer A was produced using an autoclave as batch reactor. The autoclave had an internal volume of about 20 liters and was equipped with an electromagnetic induction stirrer. The autoclave was sufficiently scavenged with nitrogen gas ($N_2$) and was subsequently filled with reduced pressure nitrogen gas five times.

While applying a reduced pressure within the autoclave, 6,960 grams (g) of deoxygenated pure water, 3,204 g of 1,1,2-trichloro-1,2,2-trifluoroethane, and 3.5 g of methylcellulose was added into the autoclave. The methylcellulose had a viscosity of 50 cp and was stirred into the composition within the autoclave at 450 rpm to act as a suspension stabilizer. The composition within the autoclave was kept at a temperature of 52° C.

A monomer composed of 25.3 wt. % of vinylidene fluoride (VDF), 68.6 wt. % of hexafluoropropylene (HFP), 6.1 wt. % of tetrafluoroethylene (TFE), was mixed into the batch as a charging gas, and charged to 10 kg/cm$^2$. Subsequently, 45.6 g of a solution of about 90 wt. % of 1,1,2-trichloro-1,2,2-trifluoroethane and 10 wt. % of diisopropyl peroxydicarbonate was charged as a catalyst to initiate polymerization. The diisopropyl peroxydicarbonate acted as an initiator for initiating polymerization. Because the pressure is reduced during the polymerization reaction, a mixed monomer having 44.7 wt. % of VDF, 32.5 wt. % of HFP, and 22.8 wt. % of TFE was added to increase the pressure back up to 10 kg/cm$^2$. After the completion of the polymerization reaction, the remaining mixed monomer was scavenged, and the resulting suspension was dehydrated with a centrifugal separator, washed with DI water, and then vacuum dried at 100° C. to obtain about 7.5 kg of Example Fluoropolymer A.

Example Fluoropolymer B

Example Fluoropolymer B was produced using a similar autoclave and set up as used to produce Example Fluoropolymer A. The autoclave was also repeatedly filled with reduced pressure-$N_2$ five times.

While applying a reduced pressure within the autoclave, 7200 g of deoxygenated pure water, 3250 g of 1,1,2-trichloro-1,2,2-trifluoroethane and 4 g of methylcellulose was added into the autoclave. The methylcellulose had a viscosity of 50 cp and was stirred into the batch within the autoclave at 500 rpm to act as a suspension stabilizer. The batch within the autoclave was kept at a temperature of 52° C.

A monomer composed of 25 wt. % of VDF, 55 wt. % of HFP, and 20 wt. % of TFE was used as a charging gas, and charged to 20 kg/cm$^2$. Subsequently, 40 g of a solution of about 85 wt. % 1,1,2-trichloro-1,2,2-trifluoroethane and 15 wt. % of diisopropyl peroxydicarbonate was charged as a catalyst to initiate polymerization. The diisopropyl peroxydicarbonate acted as an initiator for initiating polymerization. Because the pressure was reduced during the polymerization reaction, a mixed monomer of 40 wt. % of VDF, 35 wt. % of HFP, and 25 wt. % of TFE was added to increase the pressure back up to 20 kg/cm$^2$. After the completion of the polymerization reaction, the remaining mixed monomer was scavenged, and the resulting suspension was dehydrated with a centrifugal separator, washed with DI water, and then vacuum dried at 100° C. to obtain about 6 kg of Example Fluoropolymer B.

Example Fluoropolymer C

Example Fluoropolymer C was produced using an autoclave and an induction stirrer that were similar to those used to produce Example Fluoropolymer A. The autoclave was sufficiently scavenged with nitrogen gas, and charged with 3 liters of a composition of deoxidized purified water and 30 g of ammonium perfluorodecanoate, which acted as emulsifier. The composition within the autoclave was heated to 60° C. and stirred at 380 rpm.

The autoclave was then charged with a gas mixture of about 70 wt. % of VDF and about 30 wt. % of HFP until the internal pressure of the autoclave reached 20 kg/cm$^2$. Subsequently, 40 g of a solution contain about 80 wt. % of 1,1,2-trichloro-1,2,2-trifluoroethane and 20 wt. % of diisopropyl peroxydicarbonate was added into the autoclave using nitrogen. The diisopropyl peroxydicarbonate acted as an initiator for initiating polymerization.

The internal pressure within the autoclave was maintained at 20 kg/cm$^2$ during polymerization by successively injecting a gas mixture of VDF (62 wt. %) and HFP (38 wt. %). Because the polymerization rate decreased along with the progress of polymerization, an additional 30 g of solution containing about 80 wt. % of a 1,1,2-trichloro-1,2,2-trifluoroethane solution and 20 wt. % of diisopropyl peroxydicarbonate was injected using nitrogen gas 3 hours after the initiation of the polymerization reaction. The monomers were polymerized for an additional 3 hours and the resulting suspension was dehydrated with a centrifugal separator, washed with DI water, and then vacuum dried at 100° C. to obtain about 7.2 kg of Example Fluoropolymer C.

Example Fluoropolymer D

Example Fluoropolymer D was produced using an autoclave having a volume of about 3 liter, which served as a batch reactor. The autoclave had an electromagnetic induction stirrer. A batch of 936 g of DI water, 0.36 g of methylcellulose, 360 g of VDF, 0.3 g of tert-butylperoxyprivalate, 0.36 g of sodium pyrophosphate, 0.36 g of acidic sodium pyrophosphate, and 1.8 g of diethyl carbonate was charged and added into the autoclave. The batch was stirred at 10° C. for 30 minutes, and then warmed to 45° C. for 140 minutes.

The maximum pressure within the autoclave was 6 MPa. The polymerization of the monomers was terminated when the pressure in the autoclave was reduced to 2.5 MPa, which occurred 15 hours after the initial warming of the monomers. After the polymerization was completed, the polymer slurry was withdrawn, dehydrated, washed with DI water, dehydrated and then dried at 80° C. for 24 hours to obtain a vinylidene fluoride polymer (Example Fluoropolymer D) having an inherent viscosity of 2.05 dl/g and a bulk density of 0.225 g/ml at a yield of 55%.

Example 2

A non-limiting method for preparing fluorine-containing EVOH pellets formed from fluorine-containing EVOH resin composition is provided below. 16 non-limiting, exemplary EVOH resin composition containing fluoro particles (Example EVOH 1-16) and 4 comparative EVOH resin composition (Comparative EVOH 1-4) were prepared according to methods similar to the method disclosed below. However, the specific methods for producing EVOH 1-16 and Comparative EVOH 1-4 typically varied from the method disclosed below in one or more ways.

An ethylene-vinyl acetate copolymer (hereafter "EVAC") with an ethylene content of 29%, by mole, underwent saponification by 99.5% to produce EVOH polymers. Subsequently, the EVOH was dissolved into solution comprising methanol and water in a ratio of 70:30. After dissolving the EVOH into the solution of methanol and water, the solution had a 41 wt. % solid content of EVOH and was maintained at a temperature of 60° C.

The solution of methanol, water, and EVOH was then pelletized using underwater pelletization. Specifically, the solution of methanol, water, and EVOH was pumped into feeding tube with a flow rate of 120 L/min. The solution was transferred to an inlet pipe, which had a diameter of 2.8 mm, and then cut by a rotating knife at a speed of 1,500 rpm. The EVOH pellets were cooled by adding water having a temperature of 5° C. The EVOH were subsequently centrifuged to separate the EVOH pellet into particles. The separated EVOH particles were washed with water and immersed in boric acid solution and stirred (in examples of no boron addition, this step was omitted) and then dried to obtain an EVOH pellet, wherein the concentration of the boric acid solution was adjusted relative to the boron content of the final fluorine-containing EVOH resin composition.

The EVOH pellet was blended with a fluoropolymer, e.g., such as those discussed in Example 1, at certain ratios and then transferred into a twin screw extruder. The twin screw extruder had different temperatures along thirteen zones, as summarized in Table 1, below. After compounding, strand cutting was employed at a temperature of 25° C. to produce EVOH containing particles having a fluorine element (also referred to herein as fluoro particles). In Table 1, "EV27" refers to an EVOH having an ethylene content of 27 mole %, "EV29" refers to an EVOH having an ethylene content of 29 mole %, "EV32" refers to an EVOH having an ethylene content of 32 mole %, "EV38" refers to an EVOH having an ethylene content of 38 mole %, and "EV44" refers to an EVOH having an ethylene content of 44 mole %.

TABLE 1

Twin Screw Extruder Process Condition (° C.)

| Barrel | Zone 1 | Zone 2 | Zone 3 | Zone 4 | Zone 5 | Zone 6 | Zone 7 | Zone 8 | Zone 9 | Zone 10 | Zone 11 | Zone 12 | Zone 13 |
|---|---|---|---|---|---|---|---|---|---|---|---|---|---|
| EV27 | 190 | 190 | 195 | 195 | 195 | 200 | 200 | 205 | 205 | 210 | 210 | 215 | 215 |
| EV29 | 190 | 190 | 195 | 195 | 195 | 200 | 200 | 205 | 205 | 205 | 210 | 210 | 215 |
| EV32 | 185 | 185 | 190 | 190 | 190 | 195 | 195 | 200 | 200 | 205 | 205 | 210 | 210 |
| EV38 | 175 | 175 | 185 | 185 | 185 | 195 | 195 | 195 | 200 | 200 | 205 | 205 | 205 |
| EV44 | 170 | 170 | 170 | 170 | 175 | 175 | 180 | 180 | 180 | 185 | 185 | 190 | 195 |

Example 3

Example EVOH 1-16 were each formed into a film according to the method described below. Films were produced by feeding Example EVOH 1-16 and Comparative EVOH 1-4 into a single layer T-die cast film extruder (Optical Control System MEV4). The films formed from Example EVOH 1-16 and Comparative EVOH 1-4 each had a thickness of 20 μm. The temperature of the extruder was set to 220° C., while the temperature of the cast (T-die) was set to 230° C. The rotational frequency of the screw was 7 rotations/minutes (rpm).

Example 4

Example EVOH 1-16 and Comparative EVOH 1-4 were assessed to determine the properties of such EVOH and the films formed therefrom. As mentioned above, Example EVOH 1-16 were prepared according to methods similar to the method described in Example 2 above. However, the methods for producing EVOH 1-16 varied to produce EVOH having different ethylene contents, different fluoropolymers, different total fluoride ion contents, different surface fluoride ion contents, and different ratios of surface fluoride ion content to total fluoride ion content. Comparative EVOH 1-4 were also prepared according to methods similar to that described in Example 2.

Films were formed separately from Example EVOH 1-16 and Comparative EVOH 1-4 according to methods similar to the method described in Example 3. Evaluate the films to determine the appearance of the films, the precipitation on the die, and the light transmittance of the films.

Table 2, shown below, provides a summary of certain attributes, namely, the ethylene content of EVAC, the specific fluoropolymer incorporated into the fluorine-containing particles, and the fluoropolymer content, of Example EVOH 1-16 and Comparative EVOH 1-4. Table 3 provides a summary of the total fluoride ion content, surface fluoride ion content, and the ratio of the surface fluoride ion content to the total fluoride ion content of Example EVOH 1-16 and Comparative EVOH 1-4 as well as the characteristics of the films formed from Example EVOH 1-16 and Comparative EVOH 1-4.

TABLE 2

| | EVOH | | | Example | | Melting Point | |
|---|---|---|---|---|---|---|---|
| | Ethylene | | | | Fluoropolymer | $1^{st}$ Melting | $2^{nd}$ Melting |
| | Content (mol %) | Boron (ppm) | Content (wt %) | No. | Content (wt %) | Point Temp. (° C.) | Point Temp. (° C.) |
| Example EVOH 1 | 38 | 90 | 98 | A | 2 | 111 | 171.9 |
| Example EVOH 2 | 44 | 70 | 98 | A | 2 | 112 | 164.4 |
| Example EVOH 3 | 44 | 0 | 99 | A | 1 | 110 | 164.7 |
| Example EVOH 4 | 29 | 120 | 97 | B | 3 | 117 | 186 |
| Example EVOH 5 | 29 | 120 | 99 | B | 1 | 119 | 186.5 |
| Example EVOH 6 | 29 | 120 | 99.5 | B | 0.5 | 131 | 186.5 |
| Example EVOH 7 | 29 | 120 | 99.5 | C | 0.5 | 121 | 186 |
| Example EVOH 8 | 32 | 100 | 97 | C | 3 | 120.7 | 181 |
| Example EVOH 9 | 32 | 100 | 99.5 | C | 0.5 | 120 | 181.5 |
| Example EVOH 10 | 29 | 120 | 98 | D | 2 | 133 | 185.5 |
| Example EVOH 11 | 44 | 0 | 97 | D | 3 | 135 | 165 |
| Example EVOH 12 | 32 | 100 | 99 | B | 1 | 118.5 | 181 |
| Example EVOH 13 | 29 | 120 | 99 | C | 1 | 118.5 | 186.1 |
| Example EVOH 14 | 44 | 0 | 99.5 | D | 0.5 | 134.6 | 165.3 |
| Example EVOH 15 | 29 | 120 | 99 | D | 1 | 132.5 | 185.4 |

TABLE 2-continued

| | EVOH | | | Example | | Melting Point | |
| | Ethylene | | | Fluoropolymer | | 1st Melting | 2nd Melting |
| | Content (mol %) | Boron (ppm) | Content (wt %) | No. | Content (wt %) | Point Temp. (° C.) | Point Temp. (° C.) |
|---|---|---|---|---|---|---|---|
| Example EVOH 16 | 44 | 70 | 92 | D | 8 | 136 | 165.5 |
| Comparative EVOH 1 | 29 | 120 | 87 | A | 13 | 133 | 187 |
| Comparative EVOH 2 | 44 | 70 | 88 | A | 12 | 132 | 165 |
| Comparative EVOH 3 | 29 | 120 | 100 | — | — | NA | 187 |
| Comparative EVOH 4 | 44 | 70 | 99.99 | D | 0.01 | NA | 166 |

TABLE 3

| | Total Fluorine Content (ppm) | Surface Fluorine Content (ppm) | Surface Fluorine Content/ Total Fluorine Content | Fisheyes | Die precipitation | Transmittance |
|---|---|---|---|---|---|---|
| Example EVOH 1 | 8680 | 15 | 0.0017 | ○ | ○ | ○ |
| Example EVOH 2 | 9830 | 16 | 0.0023 | ○ | ○ | ○ |
| Example EVOH 3 | 4090 | 11 | 0.0026 | ○ | ○ | ○ |
| Example EVOH 4 | 12500 | 22 | 0.0017 | ○ | ○ | ○ |
| Example EVOH 5 | 3670 | 10 | 0.0027 | ○ | ○ | ○ |
| Example EVOH 6 | 1040 | 2 | 0.0019 | ○ | ○ | ○ |
| Example EVOH 7 | 334 | 2 | 0.0059 | ○ | ○ | ○ |
| Example EVOH 8 | 3050 | 20 | 0.0065 | ○ | ○ | ○ |
| Example EVOH 9 | 303 | 3 | 0.0099 | ○ | ○ | ○ |
| Example EVOH 10 | 6310 | 60 | 0.0095 | ○ | ○ | ○ |
| Example EVOH 11 | 13400 | 126 | 0.0094 | ○ | ○ | ○ |
| Example EVOH 12 | 2230 | 37 | 0.0165 | ○ | ○ | ○ |
| Example EVOH 13 | 630 | 12 | 0.0190 | ○ | ○ | ○ |
| Example EVOH 14 | 1590 | 45 | 0.0283 | ○ | ○ | ○ |
| Example EVOH 15 | 2960 | 35 | 0.0118 | ○ | ○ | ○ |
| Example EVOH 16 | 32160 | 19 | 0.0006 | ○ | ○ | Δ |
| Comparative EVOH 1 | 48350 | 70 | 0.00145 | X | ○ | X |
| Comparative EVOH 2 | 41100 | 46 | 0.00112 | X | ○ | X |
| Comparative EVOH 3 | 0 | 0 | 0 | Δ | X | Δ |
| Comparative EVOH 4 | 45 | 2 | 0.044 | Δ | X | Δ |

In order to evaluate the total fluoride ion content of Example EVOH 1-16 and Comparative EVOH 1-4, an ion chromatography (Metrohm 930 Compact IC Flex/Ses/PP/Deg) and the NIEA W415.54B water anion test method were used for analysis. 20 g of the sample was burned with oxygen bomb and extracted with water for pretreatment, and then tested. The samples were randomly sampled. After sampling 10 times and analyzing, took the average value of 10 tests.

In order to evaluate the surface fluoride ion content of Example EVOH 1-16 and Comparative EVOH 1-4, an ion chromatography (Metrohm 930 Compact IC Flex/Ses/PP/

Deg) and the NIEA W415.54B water anion test method were used for analysis. Put 0.5 g of sample pellets into 5 c.c. methanol for pretreatment, moved the solution to a 60° C. environment and stirred it for 4 hours, filtered and removed the pellets, took the 0.5 c.c. liquid obtained and burned it with oxygen bomb, then extracted it with water and conducted a test. The samples were randomly sampled. After sampling 10 times and analyzing, took the average value of 10 tests.

In order to determine the boron content, each EVOH resin composition (0.1 g) was broken down in concentrated nitric acid while applying microwaves to prepare sample solutions of the Example samples and Comparative samples. The sample solution was then diluted with pure water to adjust the concentration to 0.75 mg/ml. The boron content of the prepared solution was measured using the Thermo Scientific iCAP 7000 Series inductively coupled plasma optical emission spectrometer (ICP-OES). The boron amount, as a measurement value, corresponds to the amount of boron derived from the boron compound used.

The melting point temperatures of the Example EVOH and Comparative EVOH were determined using a TA-Q200 differential scanning calorimeter (DSC), manufactured by TA instruments, according to the procedure of ISO 11357-3 (2011), utilizing the $1^{st}$ melting point temperature and $2^{nd}$ melting point temperature from the first run of thermoscan by DSC.

For the appearance of the films formed from Example EVOH 1-16 and Comparative EVOH 1-4, "O" was given if the number of fisheyes with a size greater than 200 μm was less than 5 within a square meter, "Δ" was given if the number of fisheyes with a size greater than 200 μm was 5 to 10 within a square meter, and "X" was given if the number of fisheyes with a size greater than 200 μm was greater than 10 within a square meter. The number of fisheyes was tested using a charged coupled device (CCD) sensor and FSA-100 devising using FSA-100 V.8 software.

Evaluation of processability: the extruder system ME 25/5800V4 and the film thickness monitor FTM-200 purchased from OCS were used to inspect with human eyes. "O" was given if there was no sticking on the die or screw, and "X" was given if there was sticking on the die or screw.

The light transmittance was evaluated by the ASTM D1003 method. A film with a thickness of 25 μm was taken for measurement and analyzed using the OCS-EVOHM Gamma 12 device. Based on the above light transmittance measurement method, "O" was given if the light transmittance of the EVOH film was 90% or more, "Δ" was given if it was over 85% and less than 90%, and "X" was given for 85% or less.

The films of Example EVOH 1-16 did not stick to the die and had less than 5 fisheyes with a size greater than 200 μm within a square meter, indicating that the films formed by Example EVOH 1-16 all showed excellent appearance and processability. However, the films formed by the Comparative EVOH 1-4 showed poor appearance and processability. It was unexpectedly found that if the total fluoride ion content of the fluorine-containing EVOH resin composition is in the range of 45 to 41000 ppm, fisheyes generated when the EVOH is formed into a film can be reduced to improve mechanical properties and film appearance. As shown in Table 2, Comparative EVOH 1 and 2 had a total fluoride ion content out of the expected range described herein, and exhibited an excessive number of fisheyes. In addition, in the present invention, as long as the total fluoride ion content of the fluorine-containing EVOH resin composition containing the fluorine-containing particles is within the desired range of 45 to 41000 ppm, the fluoropolymer in the EVOH can reduce the sticking on the die or screw during processing and improve processability. In contrast, Comparative EVOH 3 and 4 had a total fluoride ion content lower than the expected range described herein, resulting in sticking on the die and screw.

For the fluorine-containing EVOH resin composition whose total fluoride ion content meets the above range, the ratio of the surface fluoride ion content to the total fluoride ion content can be further considered to obtain improved light transmittance. The surface fluorine content of the present invention is the result of comprehensive testing based on the influence of the type of fluoropolymer, the amount of fluoropolymer added, the ethylene content, and the boron content. As long as the ratio of the surface fluoride ion content to the total fluoride ion content is controlled within a specific range, the light transmittance can be improved.

Example 5

The preparation of the mixture containing fluorine-containing EVOH resin composition was based on a method similar to that of Example 2, and Example EVOH 17-38 and Comparative EVOH 5-16 were prepared. The main difference in the preparation method was that after the drying step, an additional 500 kg of the first ethylene-vinyl alcohol copolymer ($1^{st}$ EVOH) was added and mixed thoroughly with a conical screw mixer (CM-2; SHE HUI MACHINERY CO., LTD.) until uniform, wherein the operation time was 20 minutes, and the ethylene content of the ethylene-vinyl alcohol copolymer in the fluorine-containing EVOH resin composition was the same as the ethylene content of the first ethylene-vinyl alcohol copolymer. The preparation method of the first ethylene-vinyl alcohol copolymer was based on the EVOH manufacturing procedure before the fluorine-containing EVOH resin composition was mixed with the fluoropolymer, and the ethylene content was set based on the values in Table 4. The boron content was adjusted according to the ethylene content of the first ethylene-vinyl alcohol copolymer and was calculated relative to the first ethylene-vinyl alcohol copolymer: the boron content was 120 ppm when the ethylene content was 29 mole %, the boron content was 100 ppm when the ethylene content was 32 mole %, the boron content was 90 ppm when the ethylene content was 38 mole %, and the boron content was 70 ppm when the ethylene content was 44 mole %. However, the fluorine-containing EVOH resin composition and the first ethylene-vinyl alcohol copolymer of Example EVOH 37 did not contain boron, and therefore did not undergo the procedure of immersion in boric acid solution.

First, a fluorine-containing EVOH resin composition was prepared. An ethylene-vinyl acetate copolymer (hereafter "EVAC") with an ethylene content of 29 mole % underwent saponification by 99.5% to produce EVOH polymers. Subsequently, the EVOH was dissolved into solution comprising methanol and water in a ratio of 70:30. After dissolving the EVOH into the solution of methanol and water, the solution had a 41 wt. % solid content of EVOH and was maintained at a temperature of 60° C.

The solution of methanol, water, and EVOH was then pelletized using underwater pelletization. Specifically, the solution of methanol, water, and EVOH was pumped into feeding tube with a flow rate of 120 L/min. The solution was transferred to an inlet pipe, which had a diameter of 2.8 mm, and then cut by a rotating knife at a speed of 1500 rpm. The EVOH pellets were cooled by adding water having a temperature of 5° C. The EVOH pellets were subsequently centrifuged to separate the EVOH pellet into particles. The separated EVOH particles were washed with water, immersed in a boric acid solution and stirred (in examples of no boron addition, this step was omitted), and then dried to obtain EVOH pellets, wherein the concentration of the boric acid solution was adjusted according to the different ethylene content of the aforementioned EVOH and was adjusted relative to the boron content of the final fluorine-containing EVOH resin composition.

The EVOH pellets were mixed with, for example, the fluoropolymers described in Example 1 in a certain ratio, and then transferred into, for example, a twin screw (or single screw, melt stirring) extruder. The twin screw extruder had different temperatures along thirteen zones (Zone 1-Zone 13) as summarized in Table 1. After compounding, strand cutting or underwater pelletization was employed at a temperature of 25° C. to produce EVOH containing fluorine particles.

Next, the EVOH was dried. After the drying step, the first ethylene-vinyl alcohol copolymer (1st EVOH) was additionally added and mixed to prepare a mixture containing fluorine-containing EVOH resin composition.

Finally, Example EVOH 17-38 and Comparative EVOH 5-16 were formed into films according to the method described in Example 3, respectively.

As shown below, Table 4 provides a summary of some attributes of the examples (i.e., Example EVOH 17-38 and Comparative EVOH 5-16) in which the ethylene content of the mixture containing fluorine-containing EVOH resin composition is the same as the ethylene content of the first ethylene-vinyl alcohol copolymer, including the ethylene content, the specific fluoropolymer and fluoropolymer content in the fluorine-containing EVOH pellets, as well as the total fluoride ion content, the surface fluoride ion content, and the ratio of the surface fluoride ion content to the total fluoride ion content of the mixture containing fluorine-containing EVOH resin composition. In addition, the films of Example EVOH 17-38 and Comparative EVOH 5-16 prepared according to the method described in Example 3 were evaluated according to the measurement method described in Examples 2-4 to determine some properties, such as film appearance (number of fisheyes), die or screw sticking, and light transmittance.

TABLE 4

| Ethylene Content (mol %) | | 1st EVOH (wt %) | Fluorine-containing EVOH | | Fluoro-polymer | Fluorine Content (ppm) | Surface Fluorine (ppm) | Mixture | | | Fish-eyes | Stick-ing | Trans-mittance |
|---|---|---|---|---|---|---|---|---|---|---|---|---|---|
| | | | Proportion of Fluorine-containing particle | | | | | Total Fluorine (ppm) | Surface Fluorine (ppm) | Surface Fluorine/Total Fluorine | | | |
| | | | wt % | (Fluoropolymer) | | | | | | | | | |
| 29 | Example EVOH 17 | 95 | 5 | EVOH 92 Fluoro-polymer 8 | A | 27400 | 42 | 1320.0 | 2.1 | 0.0016 | ○ | ○ | Δ |
| | Example EVOH 18 | 99 | 1 | EVOH 92 Fluoro-polymer 8 | A | 27400 | 42 | 275.0 | 2.0 | 0.0073 | ○ | ○ | ○ |
| | Example EVOH 19 | 65 | 35 | EVOH 98 Fluoro-polymer 2 | D | 6310 | 60 | 2560.0 | 23.0 | 0.0090 | ○ | ○ | ○ |
| | Example EVOH 20 | 97 | 3 | EVOH 98 Fluoro-polymer 2 | D | 6310 | 60 | 280.0 | 2.0 | 0.0071 | ○ | ○ | ○ |
| | Example EVOH 21 | 90 | 10 | EVOH 92 Fluoro-polymer 8 | A | 27400 | 42 | 2596.5 | 4.0 | 0.0015 | ○ | ○ | Δ |
| | Example EVOH 22 | 85 | 15 | EVOH 99 Fluoro-polymer 1 | D | 2960 | 35 | 444.0 | 5.3 | 0.0119 | ○ | ○ | ○ |
| | Example EVOH 23 | 80 | 20 | EVOH 92 Fluoro-polymer 8 | A | 27400 | 42 | 5420.0 | 8.0 | 0.0015 | ○ | ○ | Δ |
| | Example EVOH 24 | 75 | 25 | EVOH 99 Fluoro-polymer 1 | C | 630 | 12 | 157.5 | 2.0 | 0.0127 | ○ | ○ | ○ |
| | Example EVOH 25 | 99 | 1 | EVOH 97 Fluoro-polymer 3 | B | 12500 | 22 | 125.0 | 2.0 | 0.0160 | ○ | ○ | ○ |
| | Example EVOH 26 | 80 | 20 | EVOH 97 Fluoro-polymer 3 | B | 12500 | 22 | 2845.0 | 5.0 | 0.0018 | ○ | ○ | Δ |
| | Example EVOH 27 | 90 | 10 | EVOH 97 Fluoro-polymer 3 | B | 12500 | 22 | 1645.0 | 3.5 | 0.0021 | ○ | ○ | ○ |
| | Example EVOH 28 | 95 | 5 | EVOH 97 Fluoro-polymer 3 | B | 12500 | 22 | 625.0 | 2.0 | 0.0032 | ○ | ○ | ○ |
| | Example EVOH 29 | 90 | 10 | EVOH 99 Fluoro-polymer 1 | B | 3670 | 10 | 367.0 | 2.0 | 0.0054 | ○ | ○ | ○ |

TABLE 4-continued

| Ethylene Content (mol %) | | 1st EVOH (wt %) | Fluorine-containing EVOH | | | | | Mixture | | | | | |
|---|---|---|---|---|---|---|---|---|---|---|---|---|---|
| | | | Proportion of Fluorine-containing particle | | Fluoro-polymer | Fluorine Content (ppm) | Surface Fluorine (ppm) | Total Fluorine (ppm) | Surface Fluorine (ppm) | Surface Fluorine/ Total Fluorine | Fish-eyes | Stick-ing | Trans-mittance |
| | | | wt % | (Fluoropolymer) | | | | | | | | | |
| 32 | Example EVOH 30 | 75 | 25 | EVOH Fluoro-polymer | 97 3 | C | 3050 | 20 | 762.5 | 4.0 | 0.0052 | ○ | ○ | ○ |
| | Example EVOH 31 | 85 | 15 | EVOH Fluoro-polymer | 97 3 | C | 3050 | 20 | 457.5 | 3.0 | 0.0066 | ○ | ○ | ○ |
| | Example EVOH 32 | 95 | 5 | EVOH Fluoro-polymer | 97 3 | C | 3050 | 20 | 168.0 | 2.0 | 0.0119 | ○ | ○ | ○ |
| 38 | Example EVOH 33 | 10 | 90 | EVOH Fluoro-polymer | 98 2 | A | 8680 | 15 | 7935.0 | 12.5 | 0.0016 | ○ | ○ | Δ |
| | Example EVOH 34 | 50 | 50 | EVOH Fluoro-polymer | 98 2 | A | 8680 | 15 | 4120.0 | 7.5 | 0.0018 | ○ | ○ | Δ |
| | Example EVOH 35 | 95 | 5 | EVOH Fluoro-polymer | 98 2 | A | 8680 | 15 | 450.0 | 2.0 | 0.0044 | ○ | ○ | ○ |
| 44 | Example EVOH 36 | 70 | 30 | EVOH Fluoro-polymer | 97 3 | D | 13400 | 126 | 4850.0 | 42.0 | 0.0087 | ○ | ○ | ○ |
| | Example EVOH 37 | 90 | 10 | EVOH Fluoro-polymer | 98 2 | A | 9830 | 16 | 970 | 2.0 | 0.0021 | ○ | ○ | ○ |
| | Example EVOH 38 | 90 | 10 | EVOH Fluoro-polymer | 97 3 | D | 13400 | 126 | 1258.0 | 13.2 | 0.0105 | ○ | ○ | ○ |
| 29 | Comparative EVOH 5 | 100 | 0 | EVOH Fluoro-polymer | 0 0 | 0 | 0 | 0 | 0 | 0 | 0.0000 | Δ | X | Δ |
| | Comparative EVOH 6 | 99 | 1 | EVOH Fluoro-polymer | 99 1 | D | 2960 | 35 | 70.0 | 2.0 | 0.0286 | ○ | X | ○ |
| | Comparative EVOH 7 | 99 | 1 | EVOH Fluoro-polymer | 99 1 | B | 3670 | 10 | 36.7 | 2.0 | 0.0545 | ○ | X | Δ |
| | Comparative EVOH 8 | 99 | 1 | EVOH Fluoro-polymer | 99.5 0.5 | B | 1040 | 2 | 25.0 | 2.0 | 0.0800 | ○ | X | Δ |
| | Comparative EVOH 9 | 99 | 1 | EVOH Fluoro-polymer | 99 1 | C | 630 | 12 | 6.3 | 2.0 | 0.3175 | ○ | X | Δ |
| 32 | Comparative EVOH 10 | 75 | 25 | EVOH Fluoro-polymer | 99.5 0.5 | C | 303 | 3 | 75.8 | 2.0 | 0.0264 | ○ | X | ○ |
| | Comparative EVOH 11 | 95 | 5 | EVOH Fluoro-polymer | 99.5 0.5 | C | 303 | 3 | 15.2 | 2.0 | 0.1316 | ○ | X | Δ |
| | Comparative EVOH 12 | 100 | 0 | EVOH Fluoro-polymer | 0 0 | 0 | 0 | 0 | 0 | 0 | 0.0000 | Δ | X | Δ |
| 38 | Comparative EVOH 13 | 100 | 0 | EVOH Fluoro-polymer | 0 0 | 0 | 0 | 0 | 0 | 0 | 0.0000 | Δ | X | Δ |
| 44 | Comparative EVOH 14 | 100 | 0 | EVOH Fluoro-polymer | 0 0 | 0 | 0 | 0 | 0 | 0 | 0.0000 | Δ | X | Δ |
| | Comparative EVOH 15 | 95 | 5 | EVOH Fluoro-polymer | 99.5 0.5 | D | 1590 | 45 | 79.5 | 2.3 | 0.0289 | ○ | X | ○ |
| | Comparative EVOH 16 | 70 | 30 | EVOH Fluoro-polymer | 88 12 | A | 41100 | 46 | 12150 | 11 | 0.0009 | X | ○ | X |

It was unexpectedly found that if the total fluoride ion content of the mixture containing fluorine-containing EVOH resin composition of the present invention is in the range of 100 to 11000 ppm, the film will not stick to the die and will have less than 5 fisheyes with a size greater than 200 μm within a square meter. As shown in Table 4, none of the films of Example EVOH 17-38 stuck to the die, and these films had less than 5 fisheyes with a size greater than 200 μm within a square meter.

In addition, if the ratio of the surface fluoride ion content to the total fluoride ion content of the mixture containing fluorine-containing EVOH resin composition of the present invention is in the range of 0.0019 to 0.04, the light transmittance of the film will reach more than 90%. As shown in Table 4, the mixture containing fluorine-containing EVOH resin composition with the ratio of the surface fluoride ion content to the total fluoride ion content of the EVOH resin composition ranging from 0.0019 to 0.04 all have a transmittance of more than 90%.

The Comparative EVOH 5-16 with the total fluoride ion content outside the expected range stuck to the die and had more than 5 fisheyes with a size greater than 200 μm within a square meter. The transmittance of the films of the mixture containing fluorine-containing EVOH resin composition with the ratio of the surface fluoride ion content to the total fluoride ion content out of the expected range was less than 90%. As mentioned above, when EVOH contains fluorine-containing particles and has a specific range of the total fluoride ion content, EVOH flows more smoothly in the screw extruder. Because the fluoropolymer provides protection on the inner wall of the screw extruder, the precipitation on the die is reduced and the appearance of the film is improved.

Regarding the mixture containing fluorine-containing EVOH resin composition, if the total fluoride ion content is out of the desired range, the mixture containing EVOH resin composition may exhibit undesirable film appearance and poor processability.

The mixture containing fluorine-containing EVOH resin composition obtained in this example (i.e., general purpose resin) has EVOH with a single ethylene content, which can be selected according to different gas barrier properties, flexibility characteristics, and light transmittance, and can be used for applications such as food packaging films.

Example 6

In this example, mixtures containing fluorine-containing EVOH resin compositions (Example EVOH 39-43 and Comparative EVOH 17) were prepared according to a method similar to that described in Example 5. The main difference in the preparation method was that after the drying step, an additional 500 kg of the first ethylene-vinyl alcohol copolymer (1$^{st}$ EVOH) was added and mixed thoroughly with a conical screw mixer (CM-2; SHE HUI MACHINERY CO., LTD.) until uniform, wherein the operation time was 20 minutes, and the ethylene content of the ethylene-vinyl alcohol copolymer in the fluorine-containing EVOH resin composition was different from the ethylene content of the first ethylene-vinyl alcohol copolymer. The preparation method of the first ethylene-vinyl alcohol copolymer was based on the EVOH manufacturing procedure before the fluorine-containing EVOH resin composition was mixed with the fluoropolymer, the ethylene content was set based on the values in Table 5, and the boron content was adjusted according to the ethylene content as described above. However, Example EVOH 42 was an example in which both the fluorine-containing EVOH resin composition and the first ethylene-vinyl alcohol copolymer did not contain boron, so it did not undergo the procedure of immersion in boric acid solution.

According to the method described in Example 3, Example EVOH 39-43 and Comparative EVOH 17 were made into films.

Table 5 provides a summary of some attributes of the examples (i.e., Example EVOH 39-43 and Comparative EVOH 17) in which the ethylene content of the mixture containing fluorine-containing EVOH resin composition is different from the ethylene content of the first ethylene-vinyl alcohol copolymer, including the ethylene content, the specific fluoropolymer and fluoropolymer content in the fluorine-containing EVOH pellets, as well as the total fluoride ion content, the surface fluoride ion content, and the ratio of the surface fluoride ion content to the total fluoride ion content of the mixture containing fluorine-containing EVOH resin composition. In addition, the films of Example EVOH 39-43 and Comparative EVOH 17 prepared according to the method described in Example 3 were evaluated according to the measurement method described in Examples 2-4 to determine some properties, such as film appearance (number of fisheyes), die or screw sticking, and light transmittance.

TABLE 5

| | 1$^{st}$ EVOH | | Fluorine-containing EVOH | | | | | Mixture | | | | | | |
| | | | Proportion of | | | | | | | Surface | | | | |
| | Ethylene Content (mol %) | wt % | Ethylene Content (mol %) | wt % | Fluorine-containing particle (Fluoropolymer) | | Fluoropolymer | Fluorine Content (ppm) | Surface Fluorine (ppm) | Total Fluorine (ppm) | Surface Fluorine (ppm) | Fluorine/ Total Fluorine | Fish-eyes | Stick-ing | Trans-mittance |
|---|---|---|---|---|---|---|---|---|---|---|---|---|---|---|---|
| Example EVOH 39 | 29 | 65 | 38 | 35 | EVOH Fluoro-polymer | 98 2 | A | 8680 | 15 | 3451.0 | 8.0 | 0.0023 | ○ | ○ | ○ |
| Example EVOH 40 | 29 | 60 | 44 | 40 | EVOH Fluoro-polymer | 97 3 | D | 13400 | 126 | 5540.0 | 50.4 | 0.0091 | ○ | ○ | ○ |
| Example EVOH 41 | 32 | 70 | 44 | 30 | EVOH Fluoro-polymer | 97 3 | D | 13400 | 126 | 4600.0 | 37.8 | 0.0082 | ○ | ○ | ○ |
| Example EVOH 42 | 38 | 98 | 44 | 2 | EVOH Fluoro-polymer | 97 3 | D | 13400 | 126 | 315.0 | 3.0 | 0.0095 | ○ | ○ | ○ |
| Example EVOH 43 | 38 | 65 | 44 | 35 | EVOH Fluoro-polymer | 97 3 | D | 13400 | 126 | 4690.0 | 45.0 | 0.0096 | ○ | ○ | ○ |
| Comparative EVOH 17 | 38 | 70 | 44 | 30 | EVOH Fluoro-polymer | 88 12 | A | 41100 | 46 | 12050 | 12 | 0.0001 | Δ | ○ | Δ |

The inventor found that if the total fluoride ion content of the mixture containing fluorine-containing EVOH resin composition of the present invention is in the range of 100 to 11000 ppm, the film will not stick to the die and will have less than 5 fisheyes with a size greater than 200 μm within a square meter. As shown in Table 5, none of the films of Example EVOH 39-43 stuck to the die, and these films had less than 5 fisheyes with a size greater than 200 μm within a square meter.

In addition, if the ratio of the surface fluoride ion content to the total fluoride ion content of the mixture containing fluorine-containing EVOH resin composition of the present invention is in the range of 0.0019 to 0.04, the light transmittance of the film will reach more than 90%. As shown in Table 5, the light transmittance of the films of Example EVOH 39-43 were all above 90%.

The total fluoride ion content and the ratio of the surface fluoride ion content to the total fluoride ion content of Comparative EVOH 17 were outside the expected ranges, and the light transmittance of Comparative EVOH 17 was only between 85%-90%.

Among the mixtures containing fluorine-containing EVOH resin composition (i.e., thermoforming resins) obtained in this example, EVOH with lower ethylene content has better gas barrier properties due to the higher proportion of hydrogen bonds, while EVOH with higher ethylene content has better tensile properties. Therefore, mixing two kinds of EVOH with different ethylene content can take into account both gas barrier properties and tensile properties, and can be subsequently applied to molded container packaging, such as food containers or cosmetic bottles.

Example 7

Blends containing fluorine-containing EVOH resin compositions (Example EVOH 44-49 and Comparative EVOH 18-26) were prepared according to a method similar to that described in Example 5. The main difference in the preparation method was that after the drying step, 500 kg of the first ethylene-vinyl alcohol copolymer and the second ethylene-vinyl alcohol copolymer ($1^{st}$ EVOH+$2^{nd}$ EVOH) were added and mixed thoroughly with a conical screw mixer (CM-2; SHE HUI MACHINERY CO., LTD.) until uniform, wherein the operation time was 20 minutes, and the ethylene content of the first ethylene-vinyl alcohol copolymer was different from the ethylene content of the second ethylene-vinyl alcohol copolymer. The preparation method of the first ethylene-vinyl alcohol copolymer was based on the EVOH manufacturing procedure before the fluorine-containing EVOH resin composition was mixed with the fluoropolymer, its ethylene content was set based on the values in Table 6, and its boron content was adjusted according to the ethylene content as described above. The preparation method of the second ethylene-vinyl alcohol copolymer was based on the EVOH manufacturing procedure before the fluorine-containing EVOH resin composition was mixed with the fluoropolymer, its ethylene content was set based on the values in Table 6, and its boron content was adjusted according to the ethylene content as described above.

According to the method described in Example 3, Example EVOH 44-49 and Comparative EVOH 18-26 were made into films, respectively.

Table 6 provides a summary of some attributes of the blends containing the fluorine-containing EVOH resin compositions (i.e., Example EVOH 44-49 and Comparative EVOH 18-26), namely the ethylene content, the specific fluoropolymer and fluoropolymer content in the fluorine-containing EVOH pellets, as well as the total fluoride ion content, the surface fluoride ion content, and the ratio of the surface fluoride ion content to the total fluoride ion content of the blends containing fluorine-containing EVOH resin compositions. In addition, the films of Example EVOH 44-49 and Comparative EVOH 18-26 prepared according to the method described in Example 3 were evaluated according to the measurement method described in Examples 2-4 to determine some properties, such as film appearance (number of fisheyes), die or screw sticking, and light transmittance.

TABLE 6

| | $1^{st}$ EVOH | | $2^{nd}$ EVOH | | Fluorine-containing EVOH | | | | Blend | | | | | |
| | | | | | Ethylene Content (mol %) | | Proportion of Fluorine-containing particle (Fluoropolymer) | | | Fluorine Content (ppm) | Surface Fluorine (ppm) | Total Fluorine (ppm) | Surface Fluorine (ppm) | Surface Fluorine/Total Fluorine | | | |
| | Ethylene Content (mol %) | wt % | Ethylene Content (mol %) | wt % | | wt % | | Fluoropolymer | | | | | | | Fisheyes | Sticking | Transmittance |
|---|---|---|---|---|---|---|---|---|---|---|---|---|---|---|---|---|---|
| Example EVOH 44 | 29 | 85 | 44 | 10 | 38 | 5 | EVOH Fluoropolymer | 98 2 | A | 8680 | 15 | 434.0 | 2.0 | 0.0046 | ○ | ○ | ○ |
| Example EVOH 45 | 29 | 80 | 32 | 15 | 38 | 5 | EVOH Fluoropolymer | 98 2 | A | 8680 | 15 | 456.0 | 2.0 | 0.0044 | ○ | ○ | ○ |
| Example EVOH 46 | 29 | 70 | 32 | 15 | 44 | 15 | EVOH Fluoropolymer | 98 2 | A | 9830 | 16 | 1470 | 2.4 | 0.0016 | ○ | ○ | ○ |
| Example EVOH 47 | 32 | 70 | 38 | 25 | 44 | 5 | EVOH Fluoropolymer | 98 2 | A | 9830 | 16 | 490 | 2.0 | 0.0041 | ○ | ○ | ○ |

TABLE 6-continued

| | 1st EVOH | | 2nd EVOH | | Ethylene Content (mol %) | wt % | Proportion of Fluorine-containing particle (Fluoropolymer) | | Fluoropolymer | Fluorine Content (ppm) | Surface Fluorine (ppm) | Total Fluorine (ppm) | Surface Fluorine (ppm) | Surface Fluorine/Total Fluorine | Fisheyes | Sticking | Transmittance |
|---|---|---|---|---|---|---|---|---|---|---|---|---|---|---|---|---|---|
| | Ethylene Content (mol %) | wt % | Ethylene Content (mol %) | wt % | | | | | | | | | | | | | |
| Example EVOH 48 | 32 | 75 | 38 | 22 | 44 | 3 | EVOH Fluoropolymer | 98 2 | A | 9830 | 16 | 295 | 2.0 | 0.0068 | ○ | ○ | ○ |
| Example EVOH 49 | 32 | 80 | 44 | 15 | 44 | 5 | EVOH Fluoropolymer | 98 2 | A | 9830 | 16 | 486.0 | 2.0 | 0.0041 | ○ | ○ | ○ |
| Comparative EVOH 18 | 29 | 80 | 44 | 10 | 44 | 10 | EVOH Fluoropolymer | 92 8 | A | 31800 | 15 | 3180.0 | 2.0 | 0.0006 | Δ | ○ | X |
| Comparative EVOH 19 | 29 | 80 | 38 | 10 | 44 | 10 | EVOH Fluoropolymer | 92 8 | A | 31800 | 15 | 3020.0 | 2.0 | 0.0007 | Δ | ○ | X |
| Comparative EVOH 20 | 29 | 63 | 44 | 36 | 44 | 1 | EVOH Fluoropolymer | 98 2 | A | 9830 | 16 | 82.0 | 2.0 | 0.0244 | Δ | ○ | ○ |
| Comparative EVOH 21 | 29 | 62.5 | 44 | 37 | 44 | 0.5 | EVOH Fluoropolymer | 98 2 | A | 9830 | 16 | 40.1 | 2.0 | 0.0499 | Δ | ○ | Δ |
| Comparative EVOH 22 | 29 | 72 | 44 | 27 | 44 | 1 | EVOH Fluoropolymer | 98 2 | A | 9830 | 16 | 78.5 | 2.0 | 0.0255 | Δ | ○ | ○ |
| Comparative EVOH 23 | 29 | 80 | 44 | 18 | 44 | 2 | EVOH Fluoropolymer | 98 2 | A | 9830 | 16 | 146.6 | 2.0 | 0.0136 | Δ | ○ | ○ |
| Comparative EVOH 24 | 32 | 73 | 44 | 26 | 44 | 1 | EVOH Fluoropolymer | 98 2 | A | 9830 | 16 | 83.5 | 2.0 | 0.0240 | Δ | ○ | ○ |
| Comparative EVOH 25 | 32 | 79 | 38 | 20 | 44 | 1 | EVOH Fluoropolymer | 98 2 | A | 9830 | 16 | 82.4 | 2.0 | 0.0243 | Δ | ○ | ○ |
| Comparative EVOH 26 | 32 | 95 | 44 | 4 | 32 | 1 | EVOH Fluoropolymer | 97 3 | C | 3050 | 20 | 32.5 | 2.0 | 0.0615 | Δ | X | Δ |

The inventor found that if the total fluoride ion content of the blend containing fluorine-containing EVOH resin composition of the present invention is in the range of 200 to 2000 ppm, the film will not stick to the die and will have less than 5 fisheyes with a size greater than 200 μm within a square meter. As shown in Table 6, none of the films of Example EVOH 44-49 stuck to the die, and these films had less than 5 fisheyes with a size greater than 200 μm within a square meter.

In addition, if the ratio of the surface fluoride ion content to the total fluoride ion content of the blend containing EVOH resin composition of the present invention is in the range of 0.0013 to 0.045, the light transmittance of the film will reach more than 90%. As shown in Table 6, the light transmittance of the films of Example EVOH 44-49 were all above 90%.

The total fluoride ion content of Comparative EVOH 18-26 was outside the expected range, and these films stuck to the die and had more than 5 fisheyes with a size greater than 200 μm within a square meter. The ratio of the surface fluoride ion content to the total fluoride ion content of Comparative EVOH 18-26 was out of the expected range, and the light transmittance of these films was below 90%.

The blend containing fluorine-containing EVOH resin composition obtained in this example (i.e., special resin) is based on the concept of thermoforming resin specifications, which more comprehensively averages the properties of the molding materials, and may be subsequently applied to such areas as tire inner liners or oil storage pipes.

In summary of the above, when EVOH resin composition or mixture or blend thereof contains fluorine-containing particles and has a specific range of the total fluoride ion content, EVOH flows more smoothly in the screw extruder. Because the fluoropolymer provides protection on the inner wall of the screw extruder, the precipitation on the die is reduced and the appearance of the film is improved. If the total fluoride ion content is outside the desired range, the EVOH resin composition may have undesirable film appearance and poor processability.

As used herein, all ranges provided are meant to include every specific range within, and combination of sub ranges between, the given ranges. Additionally, all ranges provided herein are inclusive of the end points of such ranges, unless stated otherwise. Thus, a range from 1-5, includes specifically 1, 2, 3, 4, and 5, as well as sub ranges such as 2-5, 3-5, 2-3, 2-4, 1-4, etc.

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls.

As used herein, the terms "comprising," "having," and "including" are used in their open, non-limiting sense. The terms "a," "an," and "the" are understood to encompass the plural as well as the singular. The expression "one or more" means "at least one" and thus may include an individual characteristic or mixtures/combinations.

Other than in the operating examples, or where otherwise indicated, all numbers expressing quantities of ingredients and/or reaction conditions may be modified in all instances by the term "about," meaning within +/−5% of the indicated number. The term "substantially free" or "essentially free" as used herein means that there is less than about 2% of the specific characteristic. All elements or characteristics positively set forth in this disclosure can be negatively excluded from the claims.

What is claimed is:

1. A fluorine-containing ethylene-vinyl alcohol copolymer resin composition, comprising:
    an ethylene-vinyl alcohol copolymer; and
    at least one fluorine-containing particle,
    wherein the fluorine-containing ethylene-vinyl alcohol copolymer resin composition has a total fluoride ion content ranging from 45 to 41000 ppm.

2. The fluorine-containing ethylene-vinyl alcohol copolymer resin composition of claim 1, wherein the fluorine-containing ethylene-vinyl alcohol copolymer resin composition has a surface fluoride ion content ranging from 1 to 126 ppm.

3. The fluorine-containing ethylene-vinyl alcohol copolymer resin composition of claim 1, wherein the fluorine-containing particle includes a fluorinated polymer.

4. The fluorine-containing ethylene-vinyl alcohol copolymer resin composition of claim 1, having at least two melting point temperatures:
    a first melting point temperature of 100° C. to about 140° C. and a second melting point temperature of 150° C. to about 195° C.

5. The fluorine-containing ethylene-vinyl alcohol copolymer resin composition of claim 2, wherein a ratio of the surface fluoride ion content to a total fluoride ion content of the fluorine-containing ethylene-vinyl alcohol copolymer resin composition ranges from 0.0015 to 0.03.

6. The fluorine-containing ethylene-vinyl alcohol copolymer resin composition of claim 1, wherein an ethylene content of the ethylene-vinyl alcohol copolymer is 24-48 mole %.

7. The fluorine-containing ethylene-vinyl alcohol copolymer resin composition of claim 1, wherein the ethylene-vinyl alcohol copolymer has a degree of saponification greater than 99.5 mole %.

8. The fluorine-containing ethylene-vinyl alcohol copolymer resin composition of claim 1, wherein the fluorine-containing ethylene-vinyl alcohol copolymer resin composition further comprises a boron content of 50-250 ppm.

9. A fluorine-containing ethylene-vinyl alcohol copolymer resin composition, comprising:
    an ethylene-vinyl alcohol copolymer; and
    at least one fluorine-containing particle,
    wherein the fluorine-containing ethylene-vinyl alcohol copolymer resin composition has a ratio of a surface fluoride ion content to a total fluoride ion content ranging from 0.0015 to 0.03.

10. A mixture containing fluorine-containing ethylene-vinyl alcohol copolymer resin composition, comprising:
    the fluorine-containing ethylene-vinyl alcohol copolymer resin composition of claim 1; and
    a first ethylene-vinyl alcohol copolymer,
    wherein per 20 g of the mixture has a total fluoride ion content ranging from 100 to 11000 ppm.

11. The mixture of claim 10, wherein the mixture has a surface fluoride ion content ranging from 2 to 55 ppm.

12. The mixture of claim 11, wherein a ratio of the surface fluoride ion content to a total fluoride ion content of the mixture ranges from 0.0019 to 0.04.

13. The mixture of claim 10, wherein the fluorine-containing ethylene-vinyl alcohol copolymer resin composition has an ethylene content that is the same as or different from an ethylene content of the first ethylene-vinyl alcohol copolymer.

14. A blend containing fluorine-containing ethylene-vinyl alcohol copolymer resin composition, comprising:
    the fluorine-containing ethylene-vinyl alcohol copolymer resin composition of claim 1;
    a first ethylene-vinyl alcohol copolymer; and
    a second ethylene-vinyl alcohol copolymer;
    wherein the first ethylene-vinyl alcohol copolymer has an ethylene content that is different from an ethylene content of the second ethylene-vinyl alcohol copolymer, and per 20 g of the blend has a total fluoride ion content ranging from 200 to 2000 ppm.

15. The blend of claim 14, wherein a ratio of a surface fluoride ion content to a total fluoride ion content of the blend ranges from 0.0013 to 0.045.

* * * * *